United States Patent
Tokuda et al.

(10) Patent No.: US 7,276,112 B2
(45) Date of Patent: Oct. 2, 2007

(54) AQUEOUS INK, INK-JET RECORDING METHOD, INK CARTRIDGE, RECORDING UNIT, INK-JET RECORDING APPARATUS AND IMAGE FORMING METHOD

(75) Inventors: Yui Tokuda, Yokohama (JP); Mikio Sanada, Yokohama (JP); Yoshihisa Takizawa, Tokyo (JP); Masashi Ogasawara, Tokyo (JP); Tomonari Watanabe, Kawasaki (JP); Takashi Imai, Yokohama (JP); Yasuhiro Nito, Yokohama (JP); Tetsu Iwata, Yokohama (JP); Shinichi Hakamada, Kawasaki (JP); Sadayuki Sugama, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/313,785

(22) Filed: Dec. 22, 2005

(65) Prior Publication Data

US 2006/0100311 A1   May 11, 2006

Related U.S. Application Data

(63) Continuation of application No. PCT/JP2005/012293, filed on Jun. 28, 2005.

(30) Foreign Application Priority Data

Jun. 28, 2004   (JP)   ............... 2004-189906
Jun. 28, 2004   (JP)   ............... 2004-189910
Jun. 28, 2004   (JP)   ............... 2004-190554

(51) Int. Cl.
    *C09D 11/02*   (2006.01)
(52) U.S. Cl. .................. 106/31.6; 106/31.89
(58) Field of Classification Search ............... 106/31.6, 106/31.89
    See application file for complete search history.

(56) References Cited

U.S. PATENT DOCUMENTS

| | | | |
|---|---|---|---|
| 5,427,611 A | 6/1995 | Shirota et al. | 106/22 A |
| 5,439,515 A | 8/1995 | Kurabayashi et al. | 106/20 R |
| 5,451,251 A | 9/1995 | Mafune et al. | 106/22 H |
| 5,482,545 A | 1/1996 | Aoki et al. | 106/22 K |
| 5,571,313 A | 11/1996 | Mafune et al. | 106/22 H |

(Continued)

FOREIGN PATENT DOCUMENTS

JP   3-56573   3/1991

(Continued)

*Primary Examiner*—J. A. Lorengo
*Assistant Examiner*—Veronica Faison-Gee
(74) *Attorney, Agent, or Firm*—Fitzpatrick, Cella, Harper & Scinto

(57) ABSTRACT

Disclosed is an aqueous ink comprising at least water, a plurality of water-soluble organic solvents and a coloring material. The coloring material is a pigment, and, it contains a pigment particle having at least one ionic group bonded to a surface of the pigment particle directly or via another atomic group. The plurality of water-soluble organic solvents have a good medium or good mediums for the pigment and a poor medium or poor mediums for the pigment. The poor medium does not solvate perfectly or substantially the pigment. The ionic group undergoes perfectly or substantially no ionic dissociation in the poor medium. Also, among the respective Ka values of the plurality of water-soluble organic solvents as determined by the Bristow method, the Ka value of the poor medium is maximum.

26 Claims, 9 Drawing Sheets

U.S. PATENT DOCUMENTS

| | | | |
|---|---|---|---|
| 5,621,447 A | 4/1997 | Takizawa et al. | 347/88 |
| 5,623,294 A | 4/1997 | Takizawa et al. | 347/98 |
| 5,680,165 A | 10/1997 | Takizawa et al. | 347/88 |
| 5,782,967 A | 7/1998 | Shirota et al. | 106/31.58 |
| 5,835,116 A | 11/1998 | Sato et al. | 347/98 |
| 5,849,815 A | 12/1998 | Aoki et al. | 523/161 |
| 5,911,815 A | 6/1999 | Yamamoto et al. | 106/31.27 |
| 5,976,233 A | 11/1999 | Osumi et al. | 106/31.86 |
| 6,007,182 A | 12/1999 | Matsubara et al. | 347/43 |
| 6,027,210 A | 2/2000 | Kurabayashi et al. | 347/100 |
| 6,036,307 A | 3/2000 | Hakamada et al. | 347/106 |
| 6,062,674 A | 5/2000 | Inui et al. | 347/43 |
| 6,174,354 B1 | 1/2001 | Takizawa et al. | 106/31.43 |
| 6,186,615 B1 | 2/2001 | Sato et al. | 347/43 |
| 6,214,963 B1 | 4/2001 | Noguchi et al. | 528/71 |
| 6,221,141 B1 | 4/2001 | Takada et al. | 106/31.6 |
| 6,238,045 B1 | 5/2001 | Ono et al. | 347/96 |
| 6,280,513 B1 | 8/2001 | Osumi et al. | 106/31.96 |
| 6,299,675 B1 | 10/2001 | Ono et al. | 106/31.27 |
| 6,332,919 B2 | 12/2001 | Osumi et al. | 106/31.6 |
| 6,342,095 B1 | 1/2002 | Takizawa et al. | 106/31.27 |
| 6,375,317 B1 | 4/2002 | Osumi et al. | 347/100 |
| 6,387,168 B1 | 5/2002 | Koitabashi et al. | 106/31.6 |
| 6,398,355 B1 | 6/2002 | Shirota et al. | 347/100 |
| 6,412,936 B1 | 7/2002 | Mafune et al. | 347/100 |
| 6,425,662 B1 | 7/2002 | Teraoka et al. | 347/100 |
| 6,471,757 B1 | 10/2002 | Koitabashi et al. | 106/31.28 |
| 6,474,803 B1 | 11/2002 | Shirota et al. | 347/100 |
| 6,498,222 B1 * | 12/2002 | Kitamura et al. | 526/307.2 |
| 6,511,534 B1 | 1/2003 | Mishina et al. | 106/31.33 |
| 6,521,034 B1 | 2/2003 | Osumi et al. | 106/31.6 |
| 6,530,656 B1 | 3/2003 | Teraoka et al. | 347/100 |
| 6,547,381 B2 | 4/2003 | Watanabe et al. | 347/100 |
| 6,552,156 B2 | 4/2003 | Noguchi et al. | 528/71 |
| 6,641,652 B2 * | 11/2003 | Ouchi et al. | 106/31.6 |
| 6,676,254 B2 | 1/2004 | Nagashima et al. | 347/100 |
| 6,698,876 B2 | 3/2004 | Sato et al. | 347/100 |
| 6,702,882 B2 | 3/2004 | Yakushigawa et al. | 106/31.27 |
| 6,706,104 B2 | 3/2004 | Takuhara et al. | 106/31.6 |
| 6,706,105 B2 | 3/2004 | Takada et al. | 106/31.6 |
| 6,723,137 B1 | 4/2004 | Hakamada et al. | 8/549 |
| 6,733,120 B2 | 5/2004 | Ogasawara et al. | 347/100 |
| 6,830,329 B2 | 12/2004 | Iwata | 347/105 |
| 6,830,709 B2 | 12/2004 | Tomioka et al. | 252/506 |
| 6,866,380 B2 | 3/2005 | Yakushigawa et al. | 347/100 |
| 6,874,881 B2 | 4/2005 | Suzuki et al. | 347/100 |
| 6,929,362 B2 | 8/2005 | Takada et al. | 347/100 |
| 6,932,465 B2 | 8/2005 | Nito et al. | 347/96 |
| 6,935,732 B2 | 8/2005 | Takada et al. | 347/96 |
| 7,005,461 B2 | 2/2006 | Sanada et al. | 523/160 |
| 7,029,109 B2 | 4/2006 | Shirota et al. | 347/100 |
| 7,055,943 B2 | 6/2006 | Suzuki et al. | 347/100 |
| 7,128,779 B2 | 10/2006 | Osumi et al. | 106/31.52 |
| 7,141,105 B2 | 11/2006 | Udagawa et al. | 106/31.49 |
| 7,144,449 B2 | 12/2006 | Udagawa et al. | 106/31.15 |
| 7,160,376 B2 | 1/2007 | Watanabe et al. | 106/31.6 |
| 2004/0027404 A1 | 2/2004 | Nagashima et al. | 347/8 |
| 2004/0252172 A1 * | 12/2004 | Hiraoka et al. | 347/100 |
| 2005/0005818 A1 | 1/2005 | Sato et al. | 106/31.27 |
| 2005/0024458 A1 * | 2/2005 | Sanada et al. | 347/100 |
| 2005/0088501 A1 * | 4/2005 | Nagashima et al. | 347/100 |
| 2005/0136208 A1 | 6/2005 | Iwata et al. | 428/41.8 |
| 2005/0195243 A1 | 9/2005 | Nagashima et al. | 347/54 |
| 2005/0204955 A1 | 9/2005 | Nagashima et al. | 106/31.59 |
| 2005/0219341 A1 | 10/2005 | Nito et al. | 347/100 |
| 2005/0282930 A1 * | 12/2005 | Fu et al. | 523/160 |
| 2006/0000386 A1 | 1/2006 | Hakamada et al. | 106/31.13 |
| 2006/0007288 A1 | 1/2006 | Takada et al. | 347/100 |
| 2006/0007289 A1 | 1/2006 | Nito et al. | 347/100 |
| 2006/0012657 A1 | 1/2006 | Nagashima et al. | 347/100 |
| 2006/0066699 A1 * | 3/2006 | Tokuda et al. | 347/100 |
| 2006/0089424 A1 | 4/2006 | Sanada et al. | 523/160 |
| 2006/0096498 A1 | 5/2006 | Tsujimura et al. | 106/31.27 |
| 2006/0098067 A1 | 5/2006 | Imai et al. | 347/100 |
| 2006/0098068 A1 * | 5/2006 | Hakamada et al. | 347/100 |
| 2006/0100311 A1 | 5/2006 | Tokuda et al. | 523/160 |
| 2006/0103703 A1 | 5/2006 | Nito et al. | 347/100 |
| 2006/0103704 A1 * | 5/2006 | Hakamada et al. | 347/100 |
| 2006/0125895 A1 | 6/2006 | Nito et al. | 347/100 |
| 2006/0125896 A1 | 6/2006 | Aikawa et al. | 347/100 |
| 2006/0132568 A1 | 6/2006 | Watanabe et al. | 347/100 |
| 2006/0135647 A1 | 6/2006 | Ichinose et al. | 523/160 |
| 2006/0137570 A1 | 6/2006 | Osumi et al. | 106/31.27 |
| 2006/0139428 A1 | 6/2006 | Osumi et al. | 347/100 |
| 2006/0139429 A1 | 6/2006 | Osumi et al. | 347/100 |
| 2006/0142417 A1 | 6/2006 | Kaneko et al. | 523/160 |
| 2006/0152570 A1 | 7/2006 | Ishikawa et al. | 347/105 |
| 2006/0192827 A1 | 8/2006 | Takada et al. | 347/100 |
| 2006/0194056 A1 | 8/2006 | Nagashima et al. | 428/403 |
| 2006/0194897 A1 | 8/2006 | Kawabe et al. | 523/160 |
| 2006/0196389 A1 | 9/2006 | Tsuji et al. | 106/31.43 |

FOREIGN PATENT DOCUMENTS

| | | |
|---|---|---|
| JP | 10-95943 | 4/1998 |
| JP | 2000-63719 | 2/2000 |
| JP | 2000-198955 | 7/2000 |
| JP | 2001-11348 | 1/2001 |
| JP | 2001-329199 | 11/2001 |
| JP | 2001-329200 | 11/2001 |
| JP | 2005-206615 | 8/2005 |

* cited by examiner

AQUEOUS INK, INK-JET RECORDING METHOD, INK CARTRIDGE, RECORDING UNIT, INK-JET RECORDING APPARATUS AND IMAGE FORMING METHOD

This application is a continuation of International Application No. PCT/JP2005/012293, filed Jun. 28, 2005, which claims the benefit of Japanese Patent Application Nos. 2004-189906, filed Jun. 28, 2004, 2004-189910, filed Jun. 28, 2004, and 2004-190554, filed Jun. 28, 2004.

BACKGROUND OF THE INVENTION

1. Field of the Invention

This invention relates to an aqueous ink which contains water, a water-soluble organic solvent and a pigment. Specifically, it relates to an aqueous ink which is suitable for recording methods and a recording apparatus making u se of an ink-jet method, i.e., ink-jet recording methods (image forming methods or recording methods), and to an ink-jet recording methods, an ink cartridge, a recoding unit, an ink-jet recording apparatus and an image forming method which make use of the aqueous ink.

2. Related Background Art

Conventionally, inks which contain pigments as colorants (pigment inks) are known to form images having good fastness such as water resistance or light resistance. In recent years, various techniques have been proposed for the purposes of improving the print density of images formed using such inks and, where color images are recorded such that areas having colors different from one another stand adjacent, more effectively keeping color mixing (bleeding) from occurring at the boundary areas of respective-color images.

For example, it is proposed to achieve significant improvement in image density by the use of an ink containing a self-dispersible carbon black and a specific salt (see, e.g., Japanese Patent Application Laid-open No. 2000-198955). A technique is also proposed in which an ink-jet recording ink which is a composition containing a pigment, fine polymer particles a water-soluble organic solvent and water and an aqueous solution containing a polyvalent metal salt are adhered to a recording medium, and the ink composition is allowed to react with the aqueous polyvalent metal salt solution to form high grade images (see, e.g., Japanese Patent Application Laid-open No. 2000-63719) In both of these techniques, the pigment present in the ink is in a dispersed state and forcedly made to flocculate on the recording medium surface to thereby keep the pigment from penetrating into the recording medium to obtain images having a much higher density and to prevent bleeding.

In addition, since in the pigment inks the pigment is made to flocculate on the recording medium, the pigment tends to remain on the surface of the recording medium. In particular, where the pigment ink is used to print images on plain paper, blurring may occur when the print surface is strongly scratched, even after a sufficient time has lapsed from printing, or print blurring may come about when something is written with an aqueous ink marker on images after printing. That is, pigment inks have a problem in that they have poor scratch and marker resistance.

Previously, some efforts have been taken for the purpose of improving scratch resistance. For example, it has been proposed that scratch resistance can be improved by adding a water-soluble emulsion to a self-dispersion type pigment ink (see, e.g., Japanese Patent Applications Laid-open Nos. H03-56573, 2001-329199 and 2001-329200).

SUMMARY OF THE INVENTION

However, according to studies made by the present inventors, it has been found that in the above techniques the area where the recording medium surface can be covered with the coloring material (what is called "area factor") may be insufficient compared with the volume of ink droplets, because pigment particles are made to flocculate on the recording medium. This means that in the above techniques the quantity of ink applied that is necessary in order to achieve the same image density is greater than that of pigment inks in which a conventional pigment is dispersed with a polymeric dispersing agent or the like. In this regard, there has been room for improvement. A method is also available in which inks are made which highly penetrate the recording medium to ensure a large area factor even when ink droplets are small in volume. However, where an ink is made highly penetrable, the ink may come to penetrate not only the surface of the recording medium but also inside the recording medium, thus making it unable to achieve sufficient image density.

The present inventors have searched for the advantages and disadvantages of individual conventional inks and analyzed the characteristic features of the images themselves. As a result, it has turned out that, as the coloring material is present in the ink in a higher concentration, the coloring material occurs in excess at the recording medium surface, dots which are formed are visually more non-uniform, or, penetrate inside the recording medium, as a result, the coloring material is wasted without participating in color development.

The present inventors have found that at least one of the above technical problems may be solved, and this enables images superior to those in conventional cases to be formed. The problems the present inventors have found are shown below. The present invention is aimed at solving at least one of the following problems.

(1) The problem that, where the pigment present in the ink in a dispersed state is forcedly made to flocculate on the recording medium surface, the area where the recording medium surface can be covered with the coloring material (what is called "area factor") is insufficient compared with the volume of ink droplets, and hence the ink must be applied in a large quantity in order to achieve the same image density.

(2) The problem that, where the ink is made highly penetrable, the ink may penetrate not only the surface of the recording medium but also inside the recording medium, thus making the coloring material unable to be distributed at a high concentration on the surface of the recording medium and in the vicinity thereof and make it unable to achieve high image density.

Accordingly, an object of the present invention is to provide, in a pigment ink, an aqueous ink which has a sufficiently large area factor even when using a small quantity of ink droplets and can form images having a high print density, and further has superior storage stability.

Another object of the present invention is to provide an aqueous ink made to have superior scratch resistance, by adding a water-soluble polymer to the aqueous ink constituted as mentioned above.

Still another object of the present invention is to provide an aqueous ink which has a sufficiently large area factor even when using a small quantity of ink droplets and can form images having high print density, also in an image forming method having the step of applying to a recording medium an aqueous ink containing a pigment and the step of applying to the recording medium a reaction liquid capable of disrupting the state of dispersion of the pigment in the aqueous ink upon contact with the aqueous ink (hereinafter this method is often also called "two-liquid system").

A further object of the present invention is to provide an aqueous ink/reaction liquid set, an ink-jet recording method, an ink cartridge, a recoding unit and an ink-jet recording apparatus which make use of the aqueous ink constituted as mentioned above.

An additional object of the present invention is to provide an image forming method which can effectively keep color mixing (bleeding) from occurring at the boundary areas of respective-color images where color images in which areas having colors different from one another stand adjacent are recorded on plain paper.

The above objects are achieved by the present invention described below. That is, an aqueous ink according to an embodiment of the present invention is an aqueous ink which comprises at least water, a plurality of water-soluble organic solvents and a coloring material, wherein the coloring material is a pigment containing a pigment particle having at least one ionic group bonded to a surface of the pigment particle directly or via another atomic group, and wherein the plurality of water-soluble organic solvents include a good medium or good mediums for the pigment and a poor medium or poor mediums for the pigment, and wherein the poor medium does not solvate perfectly or substantially the pigment, and wherein the ionic group undergoes perfectly or substantially no ionic dissociation in the poor medium, and wherein a water-soluble organic solvent which shows the maximum Ka value among the respective Ka values of the water-soluble organic solvents as determined by the Bristow method is a poor medium.

An aqueous ink according to another embodiment of the present invention is also an aqueous ink which comprises at least water, a plurality of water-soluble organic solvents and a coloring material, wherein the coloring material is a pigment containing a pigment particle having at least one ionic group bonded to a surface of the pigment particle directly or via another atomic group, and wherein the plurality of water-soluble organic solvents include a good medium or good mediums for the pigment and a poor medium or poor mediums for the pigment, and wherein the poor medium does not solvate perfectly or substantially the pigment, and wherein the ionic group undergoes perfectly or substantially no ionic dissociation in the poor medium, and wherein a water-soluble organic solvent which shows the maximum Ka value among the respective Ka values of the water-soluble organic solvents as determined by the Bristow method is a poor medium, and wherein the ink further contains a water-soluble polymer; the water-soluble polymer adsorbed perfectly not or substantially not to the pigment.

An aqueous ink according to another embodiment of the present invention is an aqueous ink which is used in an image forming method having the step of applying an aqueous ink comprising a pigment to a recording medium and the step of applying a reaction liquid capable of making the state of dispersion of the pigment in the aqueous ink unstable upon contact with the aqueous ink to the recording medium, wherein the aqueous ink constituted as described above is used as the aqueous ink.

An image forming method according to another embodiment of the present invention is an image forming method which performs recording by an ink-jet recording method on a recording medium by the use of a black ink and at least one color ink, wherein the aqueous ink constituted as described above is used as the black ink, and wherein in forming an image composed of an image formed by the black ink and an image formed by the color ink which are adjacent to each other, performing scanning for applying the black ink to form the image and thereafter performing scanning for applying the color ink to the area where the image has been formed by the precedent scanning.

According to the present invention, an aqueous ink can be provided which, in a pigment ink, has a sufficiently large area factor even when using a small quantity of ink droplets and can form images having high print density, and further has superior storage stability. According to another embodiment of the present invention, an aqueous ink can further be provided which has superior scratch resistance in addition to the above effects. According to still another embodiment of the present invention, an aqueous ink can be provided which has a sufficiently large area factor even when using a small quantity of ink droplets and can form images having high print density, also in a system in which a reaction liquid capable of disrupting the state of dispersion of the pigment in the aqueous ink is fixed to a recording. medium and thereafter the aqueous ink is applied to the part where the reaction liquid has been applied, to form an image. According to the present invention, an ink-jet recording method can also be provided which can form high-grade images with a high print density when using a small quantity of ink, in virtue of the use of such an aqueous ink. According to the present invention, an ink cartridge, a recoding unit and an ink-jet recording apparatus can still also be provided which make use of such an aqueous ink. According to the present invention, an image forming method can further be provided which can effectively keep color mixing (bleeding) from occurring at the boundary areas of respective-color images where color images in which areas having colors different from one another stand adjacent are recorded on plain paper.

DETAILED DESCRIPTION OF THE PREFERRED EMBODIMENTS

Figure 1:
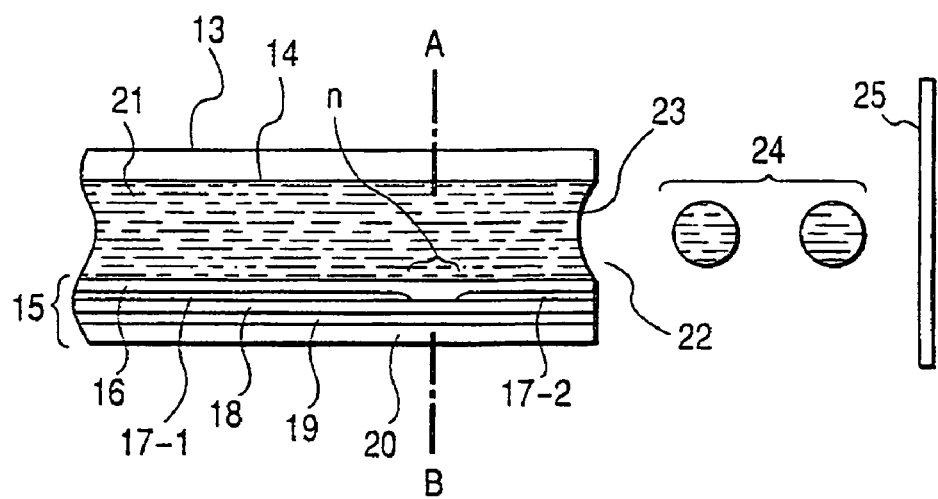
FIG. 1 is a vertical section of a recording head.

The present invention is described below in greater detail by giving best modes for practicing the present invention.

The poor medium and good medium in the present invention are described first. Details for their definition are described later. Where a pigment contains a pigment particle having at least one ionic group bonded to a surface of the pigment particle directly or via other atomic group is used as a coloring material, a water-soluble organic solvent good in dispersion stability of the pigment contained therein and a water-soluble organic poor it dispersion stability of the pigment contained therein are defined as a good medium and a poor medium, respectively. Also, the pigment and the poor medium have such a relationship that the poor medium does not solvate perfectly or substantially the pigment, and the ionic group undergoes perfectly or substantially no ionic dissociation in the poor medium.

As a characteristic feature of the present invention, taking note of water-soluble organic solvents to be contained in the aqueous ink together with a pigment, water-soluble organic solvents having the function to disperse the pigment are grouped into one showing behavior as the poor medium described above and one showing behavior as the good medium. Then, inasmuch as such constitution is employed, images effectively kept from bleeding can be obtained also on plain paper, which has had various problems in image formation performed using conventional aqueous inks, and further an aqueous ink can be obtained which has a sufficiently large area factor even when the ink is applied in a small quantity of ink droplets, and enables images having high print density to be formed. Also, inasmuch as such an aqueous ink is used, increasing printing speed, miniaturizing recording apparatus, and cost reduction in costs inclusive of costs for consumer goods can be achieved, and moreover images formed can have superior fastness, much higher image density can be achieved and high-grade images can be formed. The present inventors have found that such marked effects can be obtained, and have accomplished the present invention.

The aqueous ink according to the present invention is one which contains at least water, a plurality of water-soluble organic solvents and a coloring material, wherein the coloring material is a pigment containing a pigment particle having at least one ionic group bonded to a surface of the pigment particle directly or via other atomic group, and the water-soluble organic solvents include a good medium or good mediums for the pigment and a poor medium or poor mediums for the pigment, where the poor medium does not solvate perfectly or substantially the pigment, and the ionic group undergoes perfectly or substantially no ionic dissociation in the poor medium. When such an aqueous ink is in the state of an ink, the water, the water-soluble organic solvents having the good medium and poor medium for the pigment, and the pigment are mixed in a stated proportion, and the dispersion stability of the pigment is retained.

[Mechanism of Image Formation]

Here, the mechanism of image formation in the present invention is described by giving an example. Where the aqueous ink according to the present invention is applied onto a recording medium, in particular, plain paper and images are printed thereon, it is considered that very good image density and print grade can be brought about for the reasons as stated below.

Figure 14A:
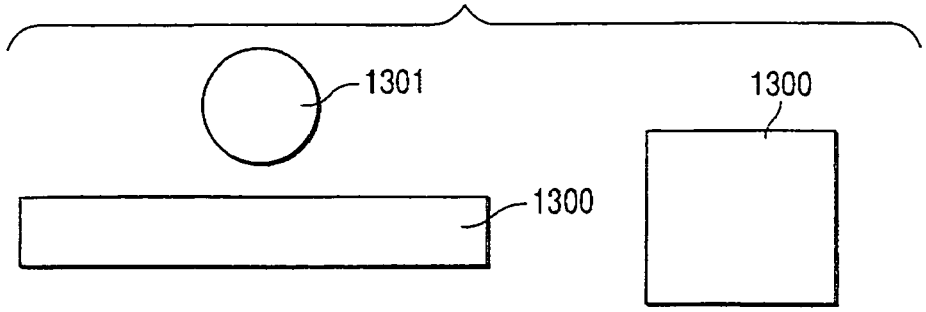
FIGS. 14A, 14B, 14C and 14D are views for diagrammatically illustrating what happens to an ink droplet when it impacts on the surface of a recording medium.
Figure 14B:
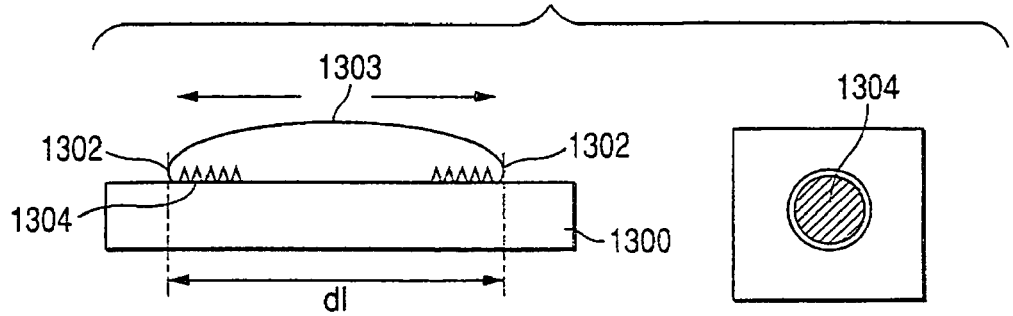

That is, as shown in FIG. 14A, where an ink droplet 1301 according to the present invention is applied to a recording medium 1300 as exemplified by plain paper and an image is printed thereon, immediately after the ink impacts on the recording medium, the proportion of i) water in the ink, ii) the good medium and poor medium for the pigment and iii) the pigment begins to change. More specifically, as shown in FIGS. 14A and 14B, after the ink droplet 1301 impacts on the surface of the recording medium 1300, the ink become fixed to the recording medium. As it becomes fixed, first, with evaporation of the water, a poor medium 1307 having a high Ka value among the water-soluble organic solvents in the ink diffuses in a closely true-circular shape in the vicinity of the recording medium surface, and an ink dot comes to be formed.

Figure 14C:
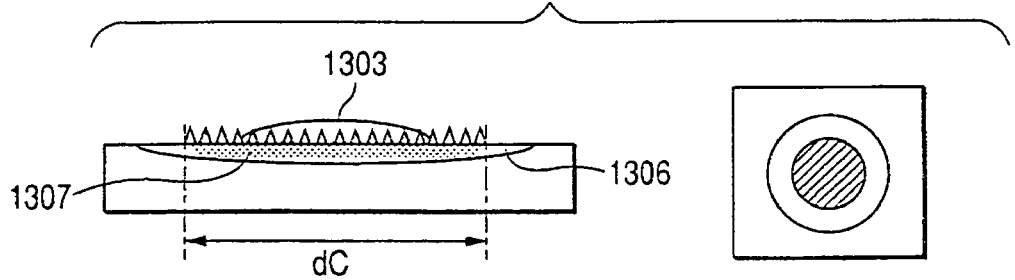
Figure 14D:
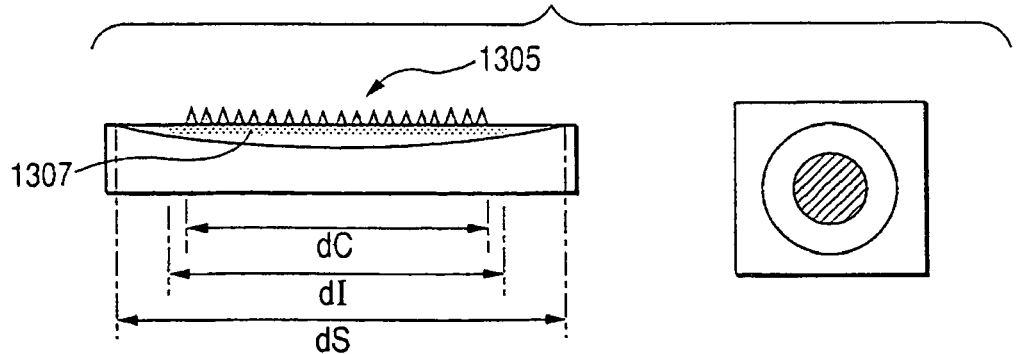

FIGS. 14B, 14C and 14D are a diagrammatic illustration concerning what happens to the ink until it becomes fixed after it impact on the surface of the recording medium 1300. Taking note of how the ink dot extends in this case, it is considered that the concentration of the poor medium becomes higher at an outer periphery 1302 of the dot at the contact part of ink with paper, as compared with that at a central part 1303 of the dot. As a result, the ink dot diffuses in the vicinity of the recording medium surface in a closely true-circular shape, and, in the course of that diffusion, the concentration of the poor medium 1307 increases abruptly with respect to the pigment. As a result, at the outer periphery 1302 of the penetrating liquid, the proportion of the poor medium for the pigment increases abruptly, and the poor medium does not solvate substantially the pigment and the ionic group of the pigment undergoes substantially no ionic dissociation in the water-soluble organic solvents. Hence, the dispersion of the pigment becomes unstable to cause flocculation or dispersion break. Here, the ink dot diffuses with closely true-circular bordering on the recording medium surface (see FIG. 4B), and it comes about that the pigment 1304 stays on the surface of the recording medium 1300, so that it appears to be as if a bank of the pigment has been formed at the outer edge portion of the dot. In this way, the dot of the pigment is formed in a true-circular shape, and in this state becomes fixed to the recording medium surface (see FIG. 14C). At this point of time, the dot formation of the pigment is completed, but the water-soluble organic solvents and water 1306 in the ink expand radially while diffusing further. That is, also after the dot formation of the pigment has been completed, the water-soluble organic solvents and water 1306 in the ink diffuse in the vicinity of the recording medium surface. Subsequently, because of evaporation and penetration of the water-soluble organic solvents at the central part 1303 rich in the good medium, the pigment becomes deposited at this part as well, so that a dot 1305 is formed. The image formed through the method as described above can have a sufficiently large area factor even when using a small quantity of ink droplets, can have high image density and can have high grade while being kept from bleeding.

[How to Distinguish Good Medium and Poor Medium]

Under the supposed mechanism as stated above, the good medium and poor medium used in the present invention are decided by whether or not the state of dispersion of the pigment can suitably be maintained. Accordingly, where the good medium and the poor medium are selected in preparing the aqueous ink according to the present invention, it is preferable to observe how much the dispersion state of the pigment used is stabilized, and select them on the basis of the result obtained. Then, in relation to the effect of the present invention, the present inventors have made various studies on standards of judgment of the good medium and poor medium that bring about the effect of the present invention. As a result, they have found that a method for judgment as described below is effective.

First, a dispersion solution of the pigment is prepared which contains 50 mass % of each water-soluble organic solvent to be judged and 45 mass % of water and also contains 5 mass % of the pigment to be used in the ink. Then, the dispersion solution thus prepared is stored at 60° C. for 48 hours, where one in which the average particle size of the pigment in the dispersion solution has come larger than the average particle size of the pigment in a water dispersion solution containing 5 mass % of the pigment and 95 mass % of water is defined as the poor medium, and one in which the average particle size of the pigment in the dispersion solution has not changed or has come smaller, as the good medium.

Specifically, it is judged in the following way Whether the water-soluble organic solvent to be used is a good medium or a poor medium for a certain pigment. First, two types of dispersion solutions, dispersion solution A of the certain pigment and water dispersion solution B of the certain pigment, are prepared which each contain the water-soluble organic solvent to be judged.

Dispersion solution A: A pigment dispersion solution having a composition in which the water-soluble organic solvent to be judged is in a concentration of 50 mass %, the pigment is in a concentration of 5 mass % and water is in a concentration of 45 mass %.

Water dispersion solution B: A water dispersion solution having a composition in which the pigment is in a concentration of 5 mass % and water is in a concentration of 95 mass %.

Next, the above dispersion solution A is stored at 60° C. for 48 hours, and thereafter cooled to ordinary temperature, and the average particle size of the pigment in the resultant dispersion-solution A is measured with a fiber-optics particle analyzer (trade name: FPAR-1000; manufactured by Otsuka Electronics. Co., Ltd.). Also, the above water dispersion solution B is not stored with heating, and in this state, the average particle size of the pigment is measured with the fiber-optics particle analyzer in the same manner as in the above. Then, the values of average particle size of the respective pigments in the above dispersion solution A and water dispersion solution B are designated as particle size (A) and particle size (B), and based on these values, the good medium and the poor medium are distinguished according to the following definitions.

Poor medium: Where the particle size (A) is larger than the particle size (B), the water-soluble organic solvent to be judged is defined as the poor medium.

Good medium: Where the particle size (A) is equal to, or smaller than the particle size (B), the water-soluble organic solvent to be judged is defined as the poor medium.

Using the good medium and poor medium having been judged in this way, the ink constituted according, to the present invention has been prepared. As a result, it has been able to be confirmed that the good results as stated previously are obtained.

[Definition of Solvation and Ionic Dissociation]

Next, explanation is given in regard to such a phenomenon that, as for the pigment and the poor medium, the poor medium does not solvate perfectly or substantially the pigment and at least one ionic group attached to the pigment particle surfaces directly or via another atomic group undergoes perfectly or substantially no ionic dissociation in the poor medium.

One factor of dispersing pigment particles is electrostatic repulsion resulting from ionic dissociation. In the pigment the pigment particle surfaces of which at least one ionic group is attached to directly or via other atomic group, the ionic group undergoes ionic dissociation in a medium and thereby the pigment particles are charged electrostatically, and the electrostatic repulsion force resulting therefrom becomes one factor of dispersing the pigment particles in the medium. One of indexes of such ionic dissociation is attracting force acting between ions in the medium. Where two electric charges $q_1$ and $q_2$ having polarities different from each other are placed at spots set apart by distance r in a medium having a relative dielectric constant $\gamma_r$ with respect to a vacuum dielectric constant $\gamma_0$, attracting force F acting on the two electric charges is known to be represented by the following expression (1).

Expression (1)

$$F = \frac{q_1 q_2}{4\pi \varepsilon_r \varepsilon_0 r^2} \tag{1}$$

Here, it is considered that the above equation (1) is also applicable to the ionic group attached to the pigment particle surfaces. With increase in this attracting force F, the distance between the ion and its counter ion becomes shorter, or ions mutually completely come into an ionic bond, so that the electrostatic repulsion force weakens because of a decrease in charge quantity of pigment particles or compression of electric double layers, and the dispersion of pigment particles becomes unstable. Then, in the case where a water-soluble organic solvent having a small relative dielectric constant $\gamma_r$ with respect to the vacuum dielectric constant $\gamma_0$ is used, it is apparent that the interionic attracting force between ions of the ionic group attached to the pigment particle surfaces increases, the ionic group of the pigment undergoes substantially no ionic dissociation in the water-soluble organic solvents, and the dispersibility of pigment particles due to the electrostatic repulsion force lowers.

However, it has been difficult to explain the dispersibility of pigments only on the basis of the degree of dissociation of ionic groups with respect to the solvent.

Accordingly, as another factor that influences the dispersion of pigment particles, the present inventors have taken note of the salvation of the pigment by the medium. The solvation referred to in the present invention is the affinity of the solvent for the pigment, and depends on how many cites the pigment has, having affinity for the medium. Examples of the sites having affinity for the medium may include pigment particle surface sites to which the ionic group does not stand attached. For example, where groups having ionic groups stand attached to the pigment particle surfaces at a high density, the pigment particle surface sites having affinity for the medium are exposed (uncovered) in a small area, and the medium may solvate the pigment with difficulty because of a cooperative effect resulting from the influence of steric hindrance due to the ionic groups with which the pigment particle surfaces are covered at a high density, resulting in a lowering of the dispersibility of the pigment, as so presumed.

When the combination of the water-soluble organic solvents with such a pigment on which the dispersion due to the electrostatic repulsion that comes from ionic dissociation of the ionic group and the dispersion due to the solvation of the pigment by the medium do not take place perfectly or substantially is applied to the aqueous ink, images are formed by the method described previously. Hence, images can be obtained which have high print density and have effectively been kept from bleeding.

An example of a method for judging that a water-soluble organic solvent does not solvate perfectly or substantially the pigment and the ionic group of the pigment undergoes perfectly or substantially no ionic dissociation in the water-soluble organic solvents, that is, the pigment is hot dispersed in the water-soluble organic solvent, is described below.

First, a pigment is readied for use in the state that the ionic group of the pigment in which the pigment containing a pigment particle having at least one ionic group bonded to a surface of the pigment particle directly or via an other atomic group has undergone no the ionic dissociation. If a pigment adaptable to the above conditions is available in the course of preparing the pigment, such a pigment may be used. If it is in the form of a pigment dispersion solution or ink in which the pigment is dispersed in the state the ionic dissociation has taken place, components other than the pigment, such as the medium, are removed by washing, evaporation or the like to prepare a pigment kept in a solid state in which the ionic group has undergone no ionic dissociation. Specifically, ultrafiltration or centrifugation and drying or the like under reduced pressure and in a high-temperature environment are effective. The pigment obtained may preferably be kept pulverized into a powder by means of a mortar or the like.

Next, the pigment pulverized product obtained as described above is added to various types of water-soluble organic solvents in a concentration of 0.05 mass %, followed by stirring for 1 hour. At this point of time, the combination of water-soluble organic solvents with a pigment in which clear solid-liquid phase separation can visually be ascertained is also available Such combination in which the solid-liquid phase separation has taken place may be judged to be one in which a water-soluble organic solvent does not solvate perfectly or substantially the pigment and the ionic group of the pigment undergoes perfectly or substantially no ionic dissociation in the water-soluble organic solvent, that is, one in which the pigment is not dispersed in the water-soluble organic solvent.

To make judgment more surely, the following may further be done. In order that a pigment not being dispersed substantially in the water-soluble organic solvent is allowed to settle to a certain extent, a mixture of the pigment and the water-soluble organic solvent is left standing. Conditions under which it is left standing depend on the viscosity and the like of the solvent, and as a standard, may be ordinary temperature and 100 hours. Thereafter, 50 mass % of the upper part of the liquid phase is gently collected and the liquid phase collected is filtered to remove coarse particles floating therein. The pore size of a microfilter used in the filtration may be determined depending on the particle size of the pigment. As a standard, it may be about 10 times the average particle size of the pigment in the aqueous dispersion. Thereafter, the concentration of the pigment contained in the resultant filtrate (a coloring material solvent dispersion solution) is measured.

As an example of methods for measuring the pigment concentration measurement based on absorbance is available. Specifically, the measurement is carried out in the following way. To a coloring material water dispersion solution in which the coloring material is dispersed in water in a known concentration (Ck mass %), pure water is added in a stated quantity to dilute the former in a stated dilution ratio, where the absorbance at 550 nm is measured. The measured value of this absorbance is represented by (ABS1). Next, the coloring material solvent dispersion solution on which the concentration is to be determined is diluted with pure water in the same dilution ratio as the above, where the absorbance at 550 nm is likewise measured. The measured value of this absorbance is represented by (ABS2). As a result, the coloring material concentration in the coloring material solvent dispersion solution is calculated according to the following expression (2).

Coloring material concentration in coloring material solvent dispersion solution (mass %)=[$Ck$×(ABS2)]/(ABS2). Expression (2)

Using the ratio of the coloring material concentration in the coloring material solvent dispersion solution, determined as shown above, to the initial coloring material concentration (0.05 mass % in the above example) in the mixture of the coloring material and the water-soluble organic solvent, the coloring material solvent dispersion percentage (%) is defined as represented by the following expression (3).

Coloring material solvent dispersion percentage (%)=[(coloring material concentration in coloring material solvent dispersion solution)/(initial coloring material concentration)]×100. Expression (3)

In regard to one in which the coloring material solvent dispersion percentage determined as shown, above is as very small as 16 or less, preferably 10 or less, and more preferably 5 or less, it may be judged that the coloring material is not dispersed substantially in the water-soluble organic solvent. It is considered that the water-soluble organic solvent has not solvated perfectly or substantially the coloring material and the ionic group of the pigment has undergone perfectly or substantially no ionic dissociation in the water-soluble organic solvent.

An example of a method for judging that a pigment is one that is not solvated perfectly or substantially by a water-soluble organic solvent and an example of a method for judging that the ionic group of the pigment undergoes perfectly or substantially no ionic dissociation in the water-soluble organic solvents which are usable in addition to the judgment method described above, will be described below.

First, as to the example of the method for judging that a pigment is one that is riot solvated perfectly or substantially by a water-soluble organic solvent, judgment may be made by measuring how much a surfactant is adsorbed to the pigment. As described previously, the extent of solvation depends on how many cites the pigment has, having affinity for a medium such as the water-soluble organic solvent. It can be, said that the number and size of such sites correlates with the adsorption level of the surfactant That is, in a pigment the water-soluble organic solvent perfectly or substantially solvate, the sites having the above affinity are in a large number or in a large size and also the adsorption of the surfactant is large. On the contrary, in the pigment the water-soluble organic solvent does not solvate perfectly or substantially, the sites having the above affinity are in a small number or in a small size, and also the adsorption of the surfactant is very small.

The surfactant has such properties that, depending on its concentration, the surface tension of a liquid changes greatly Hence, the measurement of surface tension is considered to be an effective means as an index for estimating how much the surfactant stand adsorbed to the pigment. For example, when comparing the surface tension of an aqueous solution containing a surfactant in a certain concentration with the surface tension of a liquid composed of a surfactant in the same concentration, a pigment in a certain concentration and water, the effective concentration of the surfactant that contributes to a lowering in the surface tension in the former liquid comes to be substantially equal to that in the latter liquid where almost no surfactant is adsorbed to the pigment. Hence, the surface tension of the former liquid also becomes equal to the latter liquid. On the contrary, where the surfactant becomes adsorbed to the pigment in a large quantity, the effective concentration of the surfactant lowers in the liquid containing the pigment, and hence the extent of a lowering in the surface tension is smaller than that in the aqueous surfactant solution containing no pigment. That is, as long as the pigment has no effect of remarkably lowering the surface tension of the liquid, the amount of the surfactant adsorbed to the pigment can be estimated from the difference in surface tension between the aqueous solution containing a surfactant in a certain concentration and the liquid composed of a surfactant in the same concentration, a pigment in a certain concentration and water.

Specifically, a liquid composed of a surfactant and water and having the surfactant in a concentration of 2 mmol/kg (Liquid 1) and a liquid composed of the surfactant, a pigment and water and having the surfactant in a concentration of 2 mmol/kg and the pigment in a concentration of 5 mass % (Liquid 2) are prepared first. On the surfactant, there are no particular limitations as long as it is one capable of remarkably changing the surface tension of liquids depending on its concentration. It may preferably be one which may make the liquid 1 have a surface tension of 50 mN/m or less. Specifically, a surfactant having a structure represented by the following structural formula (1) or structural formula (2) is preferred:

Structural formula (1)

(In the structural formula (1), R represents an alkyl group and n represents an integer.)

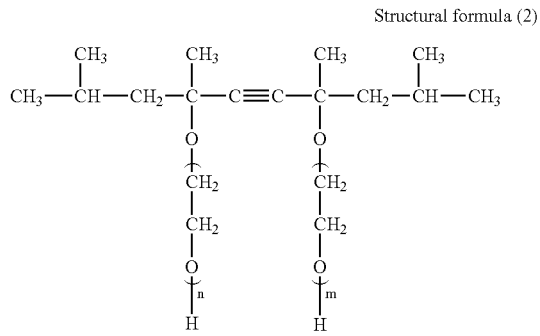

Structural formula (2)

(In the structural formula (2), m and n each represents an integer.)

In preparing the above Liquid (2), where the pigment is collected from an ink form, it is preferable to previously remove components other than the pigment by ultrafiltration or centrifugation and drying or the like under reduced pressure and in a high-temperature environment. The reason therefore is that, if the components other than the pigment, as exemplified by a solvent, a surfactant, additives and so forth which are contained in the ink, remain in a large quantity, there is a possibility that such components change the surface tension of the liquid or change the extent of adsorption of the surfactant to the pigment and hence there is such a risk that no accurate judgment results are obtainable. It is preferable that the liquid composed of a pigment collected from an ink and water and having the pigment in a concentration of 5 mass % is made up to have a surface tension of 65 mN/m or more.

Liquid 1 and Liquid 2 prepared by the above procedure are sufficiently stirred, and thereafter the surface tension of each liquid is measured. Where the surface tension of the liquid 1 is represented by A (mN/m) and the surface tension of the liquid 2 by B (mN/m) and when the relationship of B−A≦10, and preferably B−A≦5, is satisfied, it is judged that the surfactant is not adsorbed perfectly or substantially to the pigment. Then, such a pigment is judged to be the pigment a medium such as the water-soluble organic solvent does not solvate perfectly or substantially.

Next, an example of the method for judging that the ionic group of the pigment has undergone perfectly or substantially no ionic dissociation in the water-soluble organic solvents will be described below. For example, such judgment may be made by measuring electrophoresis of particles or by measuring zeta potential.

Where ionic groups of a pigment undergo dissociation in the water-soluble organic solvent, the pigment takes on electric charges, and hence their movement in a particular direction according to their polarity, i.e., what is called electrophoresis takes place in the presence of an electric field. Also, the pigment having taken on electric charges, which causes such electrophoresis, has a certain or more value in terms of an absolute value of zeta potential in the water-soluble organic solvent. Conversely, a pigment which, though having ionic groups, involves perfectly or substantially no movement toward a particular direction in the presence of an electric field, i.e., causes perfectly or substantially no electrophoresis, and has a (very) small value in terms of an absolute value of zeta potential is considered to take on perfectly or substantially no electric charges, that is, the ionic groups of the pigment undergo perfectly or substantially no ionic dissociation.

Specifically, a pigment or an ink containing the pigment is diluted with a water-soluble organic solvent of various types. Where the ink containing the pigment is used, components other than the pigment, such as water and a medium, are also inevitably contained in the dilute solution. However, they have almost no influence because the ink is diluted to be in a very low concentration, and it can be deemed that the mutual action between the water-soluble organic solvent present in large excess and the pigment is predominant.

This dilute solution is measured with an electron microscope type zeta potential measurement system (trade name: ZEECOM; manufactured by Microtec Nition). In the case where particles do not move perfectly or substantially in a particular direction when a voltage is applied thereto and undergo perfectly or substantially no electrophoresis, or in the case where the absolute value of the zeta potential measured is (very) small, it is judged that the ionic group of the pigment has undergone perfectly or substantially no ionic dissociation.

The aqueous ink according to the present invention may be constituted as in any conventional aqueous ink containing a pigment, except that the water-soluble organic solvents are specifically constituted as described above More specifically, the aqueous ink according to the present invention, which contains at least water, a plurality of water-soluble organic solvents and a coloring material, is firstly characterized in that the coloring material is a pigment containing a pigment particle having at least one ionic group bonded to a surface of the pigment particle directly or via another atomic group, and the water-soluble organic solvents include at least one good medium and at least one poor medium which have been distinguished by the judgment method as described above, where the poor medium does not solvate perfectly or substantially the pigment, and the ionic group undergoes perfectly or substantially no ionic dissociation in the poor medium, and a water-soluble organic solvent which shows the maximum Ka value among the respective Ka values of the water-soluble organic solvents as determined by the Bristow method is the poor medium. As a result, the pigment in the ink can have very superior dispersion stability and at the same time the ink can have a sufficiently large area factor even when using a small quantity of ink droplets applied onto a recording medium, in particular, plain paper, and also image formation can be carried out with a very good print grade, showing high print density.

[Ka Value of Water-soluble Organic Solvent]

In the present invention, it is essential that a water-soluble organic solvent showing the maximum Ka value among the respective Ka values of the water-soluble organic solvents, contained in the aqueous ink, is the poor medium.

The Ka value determined by the Bristow method is described below. This value is used as a measure which shows, the permeability of a liquid into a recording medium. This is described below taking as an example the case of an ink. Where the permeability of an ink is represented by the ink quantity V per 1 m$^2$, the penetration quantity V (mL/m$^2$=μm) of the ink into the recording medium after a lapse of a stated time t after ink droplets have been ejected is represented by the following Bristow's equation Expression (4).

$$V=Vr+Ka(t-tw)^{1/2} \qquad \text{(4)Expression (4)}$$

Almost all the ink immediately after applied to a recording medium is absorbed in the recording medium at uneven portions of its surface (rough portions of the recording medium surface), and is hardly permeated into the interior (in the depth direction) of the recording medium. A time for which this takes place is a contact time ($t_w$), and the quantity of the ink absorbed at the contact time in the recording medium at its uneven portions is $V_r$. When time lapses beyond the contact time after the ink is applied to the recording medium, the ink is permeated into the interior (in the depth direction) of the recording medium in a quantity proportional to the ½ power of a time lapsing beyond the contact time, i.e., $(t-t_w)^{1/2}$, so that the permeation quantity V increases. The Ka is a proportional coefficient of the portion of this increase, and takes a value corresponding to the rate of permeation. In addition, the Ka value may be measured with an instrument for testing dynamic permeability of liquid by the Bristow method (e.g., trade name: Dynamic Permeability Tester S, manufactured by Toyo Seiki Seisakusho, Ltd.).

In addition, the Ka value in the present invention, measured by the Bristow method, is a value measured using, as a recording medium, plain paper (e.g., PB paper, available from CANON INC., used for copying machines or page printers (laser beam printers) making use of an electrophotographic system and for printers making use of an ink-jet recording system, and PPC paper which is paper for copying machines making use of an electrophotographic system). Also, as for a measurement environment, an environment in usual offices or the like, e.g., temperature 20° C. to 25° C. and humidity 40% to 60%, is assumed.

Further, according to studies made by the present inventors, from the viewpoint of improving the quality of recorded images to be formed, the Ka value in the ink may preferably be so controlled as to be less than 1.5 ml/m$^2$/msec$^{1/2}$, and the Ka value may more preferably be so controlled as to be from 0.2 ml/m$^2$/msec$^{1/2}$ or more to less than 1.5 ml/m$^2$/msec$^{1/2}$. That is, the ink may be so constituted that the Ka value is less than 1.5 ml/m$^2$/msec$^{1/2}$, where the solid-liquid phase separation takes place at an early stage in the course of ink penetration into the recording medium and high-quality images can be formed.

[Water-soluble Polymer]

As stated in the above, where the pigment is present in a large quantity on the surface of the recording medium, blurring may come about when the print surface is strongly scratched, even after sufficient time lapses from completion of printing, or print blurring may occur when something is written with an aqueous ink marker on images after printing. That is, pigment inks have a problem in that they have poor scratch resistance and marker resistance.

In the aqueous ink according to the present invention, the aqueous ink constituted as described above may further be incorporated with a water-soluble polymer which is not adsorbed perfectly or substantially on the pigment. This enables scratch resistance to be improved. The reason why such superior scratch resistance is obtained is considered as stated below. The water-soluble polymer contained in the ink has very small mutual action with the pigment in a solution state. However, the ink is applied onto the recording medium and evaporation of water proceeds, whereupon the water-soluble polymer enters the boundaries between pigment particles in the course of pigment flocculation, thus mutual binding force of pigment particles increases. As a result, the pigment can more firmly fix to the recording medium to increase the scratch resistance.

[Adsorption of Water-soluble Polymer to Pigment]

The pigment used in the present invention is characterized in that the poor medium does not solvate perfectly or substantially the pigment. The pigment is further characterized in that it does not mutually act also with the water-soluble polymer, namely, the water-soluble polymer is not adsorbed substantially to the pigment particle surfaces. If the water-soluble polymer is adsorbed to the pigment particle surfaces, the ionic groups present at the pigment particle surfaces are covered with the water-soluble polymer This makes it difficult to obtain the effect of the present invention that flocculation of the pigment is promoted by the poor medium, and is considered to affect image performance greatly. Accordingly, the water-soluble polymer in the present invention may preferably be one which is not adsorbed to the pigment in the ink and remains in a free polymer.

As described previously, the method of measuring how much the surfactant becomes adsorbed to the pigment particle surfaces is available as the method for judging that the poor medium does not solvate the pigment. As in this method, as a method for judging that the water-soluble polymer does not come adsorbed to the pigment, a method is available in which the surface tension of an aqueous solution containing a water-soluble polymer is compared with the surface tension of an aqueous solution containing a water-soluble polymer, a pigment and water, judging how much the water-soluble polymer stand adsorbed to the pigment.

Specifically, a liquid containing a water-soluble polymer and water and having the water-soluble polymer in a concentration of 0.1 mass % (Liquid 3), a liquid containing the water-soluble polymer, a pigment and water and having the water-soluble polymer in a concentration of 0.1 mass % and the pigment in a concentration of 5 mass % (Liquid 4) and a liquid containing a pigment and water and having the pigment in a concentration of 5.0 mass % (Liquid 5) are prepared first.

Liquid 3, Liquid 4 and Liquid 5 prepared by the above procedure are sufficiently stirred, and thereafter the surface tension of each liquid is measured at ordinary temperature (25° C.). Where the surface tension of Liquid 3 is represented by C (dyne/cm), the surface tension of Liquid 4 by D (dyne/cm) and the surface tension of Liquid 5 by E (dyne/cm), and when the relationship of D–C≦10, and preferably D–C≦5, and the relationship of the following expression (5) are satisfied, it is judged that the water-soluble polymer is not adsorbed perfectly or substantially to the pigment.

Expression (5)

$$\frac{D-C}{E-C} \leq 0.3 \qquad (5)$$

The surface tension measured in the state the water-soluble polymer is not adsorbed perfectly to the pigment, namely, the surface tension measured in the state the water-soluble polymer does not affect any change in surface tension of the liquid is the surface tension E of Liquid 5. Also, the surface tension measured in the state the water-soluble polymer is free in the aqueous solution, namely, the surface tension measured assuming a state in which adsorption of the water-soluble polymer on the pigment has reached saturation and free polymers are present in the aqueous solution is the surface tension C of Liquid 5. Thus, the value of E–C represents the level of change in surface tension from the start to completion of the adsorption.

In contrast, the surface tension measured in the state that the pigment and the water-soluble polymer are mixed is the surface tension D of Liquid 4. The water-soluble polymer in Liquid 4 is considered to be in two states, (1) a state in which it is adsorbed to the pigment and (2) a state in which it is present as free polymers in the aqueous solution. Although it is difficult to accurately find out the details of the states (1) and (2) with respect to the total mass of the water-soluble polymer added to Liquid 4, it is possible to estimate them to a certain extent according to the above expression (5). Thus, the value of DC represents the level of change in surface tension from the start to completion of the adsorption, to which change the water-soluble polymer has contributed.

For example, where the difference between the surface tension D and the surface tension C is small, namely, the value of (D–C)/(E–C) shows a value of 0.3 or less, it is considered that the state of the surface tension D and the state of the surface tension C are very close to each other, and the state of the surface tension D is close to the concentration of free polymers necessary for exhibiting the surface tension C. On the contrary, where the difference between the surface tension D and the surface tension C is large, namely, the value of (D–C)/(E–C) shows a value of more than 0.3, the state of the surface tension D and the state of the surface tension C are considered to be different from each other, and it is considered that the state of the surface tension D does not become the concentration of free polymers necessary for exhibiting the surface tension C and the water-soluble polymer is adsorbed to the pigment.

[Two-Liquid System]

When the aqueous ink of the present invention is used as an aqueous ink used in an image forming method (two-liquid system) having the step of applying an aqueous ink comprising a pigment to a recording medium and the step of applying a reaction liquid capable of making the state of dispersion of the pigment in the aqueous ink upon contact with the aqueous ink to the recording medium, as compared with cases in which images are formed by a conventional two-liquid system, the ink can have a sufficiently large area factor even when using a small quantity of ink droplets and images having high print density can be obtained. The reason why the effect as stated above is obtainable is considered as stated below.

The conventional two-liquid system is aimed at obtaining images with high print density by leaving a coloring material at the recording medium surface layer portion in a larger quantity. Hence, an aqueous ink and a reaction liquid are brought into contact with each other immediately before, or at the same time, the aqueous ink and the reaction liquid are applied to the recording medium, to complete the reaction. Accordingly, a small area factor may result for a large quantity of ink droplets in some cases.

However, as in the present invention, a time difference is provided between applying the reaction liquid to the recording medium and applying the aqueous ink, whereby reactive components in the reaction liquid are present in a larger amount at a place where the ink has penetrated in the depth direction a little far from the surface portion of the recording medium, than at the surface portion of the recording medium. The aqueous ink of the present invention is applied to the recording medium standing in this way, whereupon the phenomenon shown in FIGS. 14A, 14B and 14C takes place before the pigment reacts with the reactive component. Thereafter, the remainder of a coloring material having penetrated in the depth direction a little far from the surface portion of the recording medium reacts rapidly with the reactive components present in a large quantity at the place where the ink has penetrated in the depth direction a little far from the surface portion of the recording medium. Hence, the ink has a sufficiently large area factor at the surface portion of the recording medium, and the coloring material is kept from penetrating in the depth direction of the recording medium, whereby images having a high print density can be obtained.

On the other hand, if an aqueous ink not falling under the present invention is applied to a recording medium, it is very difficult to form flocculates of the coloring material at the desired positions, unless the penetration rate of the liquid medium are elaborately balanced with the flocculation rate of the coloring material Hence, if such an aqueous ink not falling under the present invention is applied,the bleeding-preventive performance may lower, the ink may have small area factor, considering the large quantity of ink droplets and images having high print density may be unobtainable.

<Water Based Ink>

In the aqueous ink according to the present invention, it is essential that the water-soluble logic solvents are constituted as described above, in relation to the pigment to be used. Except for that the ink may be constituted as in conventional inks. The aqueous medium, coloring material, water-soluble polymer and other components constituting the aqueous ink of the present invention are described below.

[Aqueous Medium]

The aqueous medium constituting the aqueous ink according to the present invention is described. The aqueous medium is a mixed solvent of water and the water-soluble organic solvents. In the present invention, as stated previously, the water-soluble organic solvents are be grouped into the good medium and the poor medium for the pigment. Then on the basis of the results of such judgment, it is required that the water-soluble organic solvents are so selected and appropriately mixed that at least the good medium and the poor medium are intermixed and also the content of each water-soluble organic solvent is within the range specified in the present invention, preparing the ink.

The water-soluble organic solvents may specifically include; e.g., alkyl-alcohols having 1 to 4 carbon atoms such as methyl alcohol, ethyl alcohol, n-propyl alcohol, isopropyl alcohol, n-butyl alcohol, sec-butyl alcohol and tert-butyl alcohol; amides such as dimethylformamide and diethylacetamide; ketones or ketoalcohols such as acetone and diacetone alcohol; ethers such as tetrahydrofuran and dioxane; polyalkylene glycols such as polyethylene glycol and polypropylene glycol; alkylene glycols whose alkylene groups have 2 to 6 carbon atoms such as ethylene glycol, propylene glycol butylene glycol, triethylene glycol, 1,2,6-hexanetriol, thiodiglycol, hexylene glycol and diethylene glycol; lower alkyl ether acetates such as polyethylene glycol monomethyl ether acetate; glycerol; lower alkyl ethers of polyhydric alcohols, such as ethylene glycol monomethyl(or ethyl) ether, diethylene glycol methyl(or ethyl) ether and triethylene glycol monomethyl(or ethyl) ether; and N-methyl-2-pyrrolidone, 2-pyrrolidone, and 1,3-dimethyl-2-imidazolidinone. Also, as water, deionized water may preferably be used.

There are no particular limitations concerning the content of the water-soluble organic solvents in the aqueous ink according to the present invention. It may preferably be in the range of from 3 mass % to 50 mass % based on the total mass of the ink. Also, the water in the aqueous ink may preferably be in a content ranging from 50 mass % to 95 mass % based on the total mass of the ink.

In a preferred embodiment of the present invention, where the total content (mass %) of the good medium in the aqueous ink is represented by X and the total content (mass %) of the poor medium in the ink by Y, the types and contents of the water-soluble organic solvents constituting the aqueous ink are so controlled that the ratio of X:Y [total content (mass %) of the good medium:total content (mass %) of the poor medium] comes to be within the range of from X:Y=10:5 or more to 10:30 or less, preferably from X:Y=10:5 or more to 1.0:10 or less, and more preferably from X:Y=10:6 or more to 10:10 or less. In addition, the "ratio of X:Y=10:5 or more to 10:30 or less" means that Y is 5 or more to 30 or less when X is 10.

According to studies made by the present inventors, where the good medium contained in the aqueous ink is in a large content, the aqueous ink can have superior storage stability, but it is difficult to achieve high print density. Also, where on the other hand the good medium contained in the aqueous ink is in a small content, high print density can be achieved, but the aqueous ink may have insufficient storage stability. For such a problem, the proportion of the good medium to the poor medium in the water-soluble organic solvents in the ink may be controlled as described above, whereby both the ink storage stability and the high print density can be achieved. Further, as described previously, in the present invention, the Ka value determined by the Bristow method, which is a measure showing the permeability into recording mediums, is controlled in deciding each water-soluble organic solvent to be incorporated in the ink. This makes it possible to achieve the effect that has not been unobtainable, i.e., the effect that the ink has a sufficiently large, area factor even in a small quantity of ink droplets and can materialize high print density.

[Coloring Material]

The coloring material constituting the aqueous ink according to the present invention is described below. As the coloring material constituting the aqueous ink of the present invention, a pigment containing a pigment particle having at least one ionic group bonded to a surface of the pigment particle directly or via another atomic group is used As long as this condition is fulfilled, there are no particular limitations thereon. The following are usable: a pigment containing a pigment particle having a compound having an ionic group has been made attached to by a diazo coupling method to a surface of the pigment particle, a pigment containing a pigment particle having an ionic group has been introduced to by surface oxidation treatment such as treatment with sodium hypochloride or ozone treatment in water to a surface of the pigment particle, and a pigment on which a dispersing agent having an ionic group, a surfactant, a resin dispersing agent or the like has been adsorbed to a surface of the pigment particle. Any of these pigments may be used alone or in the form of a mixture of two or more types.

In particular, it is preferable to use a pigment containing a pigment particle having at least one selected from the group consisting of —COOM1, —SO$_3$M1 and —PO$_3$H (M1)$_2$ (wherein M1 represents a hydrogen atom, an alkali metal, an ammonium or an organic ammonium) has chemically been bonded to directly or via another atomic group to a surface of the pigment particle. Further, it is preferable to use those in which such another atomic group is an alkylene group having 1 to 12 carbon atoms, a substituted or unsubstituted phenylene group or a substituted or unsubstituted naphthylene group. In the case of a pigment containing a pigment particle having of which —COOM1, among the above ionic groups, has chemically been bonded to directly or via another atomic group to a surface of the pigment particle, it may exhibit water resistance relatively with ease, and hence may more preferably be used.

Specifically, it is also preferred to use a pigment containing a pigment particle of which a —C$_6$H$_4$—COOM1 group or a —C$_6$H$_3$—(COOM1)$_2$ group (wherein M1 represents a hydrogen atom, an alkali metal, an ammonium or an organic ammonium) has been introduced to a surface of the pigment. In particular, the one in which a —C$_6$H$_3$—(COOM1)$_2$ group has been introduced brings about preferable results in the constitution of the present invention.

In regard to the amount in which the above —C$_6$H$_4$—COOM1 group or —C$_6$H$_3$—(COOM1)$_2$ is introduced to the pigment particle surfaces, preferable results in the constitution of the present invention are brought out when the amount of introduction per unit surface area of a pigment particle is larger. This is considered due to the fact that as described previously the extent of salvation of the pigment by the water-soluble organic solvents is reduced with an increase in ionic groups, because of steric hindrance or the like.

There are no particular limitations concerning the pigment usable in the aqueous ink according to the present invention, and any of those as enumerated below may be used.

As a pigment used in black ink, carbon black is preferred. Any carbon black may be used, as exemplified by furnace black, lamp black, acetylene black or channel black. Specifically, commercially available products are usable which are exemplified by RAVEN 7000, RAVEN 5750, RAVEN 5250, RAVEN 5000 ULTRA, RAVEN 3500, RAVEN 2000, RAVEN 1500, RAVEN 1250, RAVEN 1200, RAVEN 1190ULTRA-II, RAVEN 1170, and RAVEN 1255 (the foregoing are available from Columbian Carbon Japan Limited); BLACK PEARLS L, REGAL 400R, REGAL 330R, REGAL 660R, MOGUL L, MONARCH 700, MONARCH 800, MONARCH 880, MONARCH 900, MONARCH 1000, MONARCH 1100, MONARCH 1300, MONARCH 1400, MONARCH 2000, and VALCAN XC-72 (the foregoing are available from Cabot Corp.); COLOR BLACK FW1, COLOR BLACK FW2, COLOR BLACK FW2V, COLOR BLACK FW18, COLOR BLACK FW200, COLOR BLACK S150, COLOR BLACK S160, COLOR BLACK S170, PRINTEX 35, PRINTEX U, PRINTEX 140U, PRINTEX 140V, SPECIAL BLACK 6, SPECIAL BLACK 5, SPECIAL BLACK 4A, and SPECIAL BLACK 4 (the foregoing are available from Degussa Corp.); and No.25, No.33, No.40, No.47, No.52, No.900, No.2300, MCF-88, MA600, MA7, MA8, and MA100, (the foregoing are available from Mitsubishi Chemicals, Inc.). Also usable is carbon black prepared specially newly for the present invention. However, in the present invention, examples are by no means limited to these, and any conventionally known carbon black may be used. Also, in addition to the carbon black magnetic fine particles of magnetite, ferrite or the like and titanium black may also be used as a black pigment.

Pigment particles used in inks other than the black ink may include various types of or organic pigment particles. Such organic pigments may include, e.g., insoluble azo pigments such as Toluidine Red, Toluidine maroon, Hanza Yellow, Benzidine Yellow and Pyrazolone Red; soluble azo pigments such as Lithol Red, Helio Bordeaux, Pigment Scarlet and Permanent Red 2B; derivatives from vat dyes, such as alizarin, indanthrone and Thioindigo maroon; phthalocyanine type pigments such as Phthalocyanine Blue and Phthalocyanine Green; quinacridone type pigments such as Quinacridone Red and Quinacridone Magenta; perylene type pigments such as Perylene Red and Perylene Scarlet; isoindolinone type pigments such as Isoindolinone Yellow and Isoindolinone Orange; imidazolone type pigments such as Benzimidazolone Yellow, Benzimidazolone Orange and Benzimidazolone Red; pyranthrone type pigments such as Pyranthrone Red and Pyranthrone Orange; and indigo type pigments, condensation azo type pigments, thioindigo type pigments, diketopyrrolopyrrole type pigments, Flavanthrone Yellow, Acyl Amide Yellow, Quinophthalone Yellow, Nickel Azo Yellow, Copper Azomethine Yellow, Perinone Orange, Anthrone Orange, Dianthraquinonyl Red, and Dioxazine Violet. Of course, without being limited to these, other organic pigments may also be used.

The organic pigments usable in the present invention, when shown by Color Index (C.I.) Number, may include, e.g., the following:

C.I Pigment Yellow 12, 13, 14, 17, 20, 24, 74, 83, 86, 93, 97, 109, 110, 117, 120, 125, 128, 137, 138, 147, 148,. 150, 151, 153, 154, 166, 168, 180, 185;

C.I. Pigment Orange 16, 36, 43, 51, 55, 59, 61, 71 etc.;

C.I. Pigment Red 9, 48, 49, 52, 53, 57, 97, 122, 123, 149, 168, 175, 176, 177, 180, 192, 215, 216, 217, 220, 223, 224, 226, 228, 238, 240, 251, 255, 272;

C.I. Pigment Violet 19, 23, 29, 30, 37, 40, 50;

C.I. Pigment Blue 15, 15:1, 15:3, 15:4, 15:6, 22, 60, 64;

C.I. Pigment Green 36; and

C.I. Pigment Brown 23, 25, 26.

In the present invention, the pigment may preferably be in a content of from 0.1 mass % to 15 mass %, and particularly preferably from 1 mass % to 10 mass %, based on the total mass of the ink.

[Water-soluble Polymer]

The water-soluble polymer that may be added to the aqueous ink according to the present invention is described below. In the present invention, the water-soluble polymer is judged by the method described previously, in respect of whether it is not adsorbed perfectly or substantially to the pigment. Then, on the basis of the results of such judgment, a water-soluble polymer which is not adsorbed perfectly or substantially to the pigment must be selected and appropriately mixed to prepare the ink.

The water-soluble polymer used in the present invention may preferably be an ionic polymer or nonionic polymer having a hydrophilic group The ionic polymer may preferably be a homopolymer composed of an ionic monomer, or a copolymer of a hydrophobic monomer and anionic monomer. The nonionic polymer preferably is a homopolymer composed of a nonionic monomer, or a copolymer of a hydrophobic monomer and a nonionic monomer. Also, in the present invention, these polymers may be used in combination. These are described below by citing specific groups of monomers.

(Ionic Monomer)

The ionic monomer may preferably be an anionic monomer. Specifically, it may include acrylic acid, methacrylic acid, maleic acid and styrenesulfonic acid. Any of these may be used alone or in an appropriate combination of two or more types. Of course, in the present invention, examples are by no means limited to these.

(Nonionic Monomer)

The nonionic monomer may specifically include, e.g., polyvinyl ether derivatives such as polyvinyl alcohol, polyvinyl pyrrolidone, polyacrylamide, polyvinyl methyl ether, polyvinyl ethyl ether and polyvinyl butyl ether; polysaccharides such as cellulose, methyl cellulose and ethyl oxyethyl cellulose; alginic acid polyhydric alcohol esters; water-soluble urea resins; dextrin derivatives; casein; polyvinyl ether compounds; and polyalkylene oxides such as polyethylene oxide and polypropylene oxide, inclusive of a copolymer of the both. Any of these may be used alone or in an appropriate combination of two or more types. Of course, in the present invention, examples are by no means limited to these.

(Hydrophobic Monomer)

The hydrophobic monomer may specifically include, e.g., styrene, vinyl naphthalene, alkyl methacrylates such as methyl methacrylate; phenyl methacrylate, benzyl methacrylate, 2-ethoxyethyl methacrylate, methacrylonitrile, 2-trimethylsiloxyethyl methacrylate, glycidyl methacrylate, p-tolyl methacrylate, sorbyl methacrylate, alkyl acrylates such as methyl acrylate; phenyl acrylate, benzyl acrylate, acrylonitrile, 2-trimethylsiloxyethyl acrylate, glycidyl acrylate, p-tolyl acrylate, and sorbyl acrylate. Any of these may be used alone or in appropriate combination of two or more types. Of course, in the present invention, examples are by no means limited to these.

(Polymer)

The water-soluble polymer according to the present invention may preferably be a homopolymer composed of an ionic monomer, a homopolymer composed of a nonionic monomer, a copolymer composed of an ionic monomer and a hydrophobic monomer, or a copolymer composed of a nonionic monomer and a hydrophobic monomer, any of which may be used in combination, or branched polymers as typified by block copolymers, random coplymers and graft copolymers, or salts thereof may be used. In addition, as specific examples of the salts, they may include salts of alkali metals such as sodium, lithium and potassium, and ammonium salts, alkylamine salts and alkanolamine salts. Any of these may be used alone or in an appropriate combination of two or more types.

Where the above copolymers are anionic, they may have acid values in the range of from 100 to 500, and the scattering of the acid value may preferably be within 20% of the average acid value. By controlling the acid value within the above range, the pigment can stably be dispersed in the ink.

The water-soluble polymer may have a weight-average molecular weight in the range of from 1,000 to 30,000, and more preferably in the range of from 3,000 to 15,000, and also may preferably have a molecular weight distribution Mw/Mn (Mw: weight-average molecular weight, Mn: number-average molecular weight) of 3 or less. Also, an ionic polymer segment may preferably have weight-average molecular weight (Mw) in the range of from 1,000 to 20,000, and more preferably in the range of from 3,000 to 20,000. Inasmuch as the content of the ionic polymer segment in the water-soluble polymer is controlled within the above range, the ink can be kept from coming highly viscous and the pigment can have dispersion stability; the both being achievable together at high levels. Also, if the water-soluble polymer has a broad molecular weight distribution, the properties based on molecular weight of the water-soluble polymer described above may be brought out with difficulty. Hence, the water-soluble polymer may preferably have a uniform molecular weight distribution. Such a water-soluble polymer may preferably be incorporated in the range of from 0.1 mass % to 5.0 mass % based on the total mass of the ink. Further, the proportion of contents (mass %) of the pigment and water-soluble polymer contained in the ink (P/B ratio) may preferably be from 0.02 to 150.

In the embodiment in which the water-soluble polymer is added to the aqueous ink, it is aimed at materializing an aqueous ink that can simultaneously satisfy three performances, i.e., high print density, bleeding inhibition, and high scratch resistance. In particular, in order to improve the scratch resistance, it is effective to add the water-soluble polymer in a large quantity, as known in the art. However, if the addition amount of anionic polymers is increased, the dispersion of the pigment in the ink comes to be unstable because of the salting-out effect and the pigment tends to flocculate.

The concept of the present invention may be explained on the basis of a view of salting-out. The salting-out is a phenomenon in which a solute hydrated to dissolve stably in a solution decreases in its solubility and the solute comes to precipitate, because ions are generated in a large quantity as a result of the addition of an additional electrolyte to bring the hydration into imbalance and hence hydration water is removed from the solute that is hydrated with greater difficulty.

The pigment dispersed in virtue of ionic groups is hydrated by a large quantity of water molecules in the solution and stands dispersed stably. A salt of an anionic polymer is added to this solution whereupon hydration takes place also on the ions generated when the polymer is dissolved and hence the water molecules tend to come short. In this case, the water molecules hydrating the pigment are deprived, so that the dispersion stability of the pigment decreases greatly.

In addition, the addition of the anionic polymer in a large quantity tends to adversely affect the thickening and storage stability of the ink. Further, it is known that the presence of the anionic polymer in the ink in a large quantity makes the ink greatly penetrable into the recording medium, resulting in a poor print grade.

As a result of studies made by the present inventors, they have discovered that the nonionic polymer, which has no ionic group and is considered to less contribute to the dispersion stability of the pigment, maybe added to the ink, whereby an ink is obtained which provides printing improved in scratch resistance and maintains good dispersion stability of the pigment. It has come to light that, where only the nonionic polymer is added to the ink, it is possible to add the polymer in a larger quantity than in a case in which only the anionic polymer is added, and further the scratch resistance is very improved. However, in regard to bleeding, it has been found that, where only the nonionic polymer is used, the performance is poorer than in a case in which only the anionic polymer is used. This is because the ion concentration in the ink does not increase even if the nonionic polymer, which has no ionic group, is added to the ink, and the flocculation of the pigment in virtue of the salting-out effect is not promoted.

Accordingly, in the present invention, it has been found that the above three technical subjects can be solved by using the anionic polymer and the nonionic polymer in combination; the former being effective in promoting the flocculation of the pigment, improving the print density and inhibiting bleeding, and the latter being effective in improving the scratch resistance. Thus, water-soluble polymers to be added have functionally be separated. It has been found also in actual image evaluation that high print density, control of bleeding and high scratch resistance can simultaneously be satisfied where the anionic polymer and the nonionic polymer are used in combination.

The present inventors presume, as stated below, the reason why the high scratch resistance is achievable. In the course of the application of a pigment ink to a recording medium and thereafter the evaporation of water in the ink, the water-soluble polymers are precipitated or adsorbed to the recording medium surface, whereby flocculating force acts to strengthen the flocculation of the pigment. Accordingly, even when contact of the pigment with an external environment takes place, e.g., the print surface is strongly scratched or something is written with an aqueous ink marker on images, the scratch of the pigment from the recording medium surface is reduced, thus the scratch resistance is improved. In order to enhance the flocculating force between pigment particles to improve the scratch resistance, it is more preferable to use the copolymer of an ionic monomer and a hydrophobic monomer, the copolymer of a nonionic monomer and a hydrophobic monomer or the like, which is considered to be able to increase the binding force between pigment particles and enhance the adsorbing force of the water-soluble polymers to the pigment particle surfaces.

[Other Components]

Besides the components described above, the aqueous ink according to the present invention may use as ink components a moisture-retention compound such as urea, a urea derivative, trimethylolpropane or trimethylolethane in order to maintain moisture retention. In the ink, the moisture-retention compound such as urea, a urea derivative or trimethylolpropane may commonly preferably be in a content ranging from 0.1 mass % to 20.0 mass %, and more preferably from 3.0 mass % to 10.0 mass %, based on the total mass of the ink.

Besides the components described above, the aqueous ink according to the present invention may further be incorporated with various additives such as a surfactant, a pH adjuster, a rust preventive, an antiseptic agent, a mildew-proofing agent, an antioxidant, a reduction-preventive agent, an evaporation accelerator and a chelating agent.

The surfactant used in the present invention may preferably be a compound having a structure represented by the following structural formula (1) or structural formula (2).

Structural formula (1)

(In the structural formula (1), R represents an alkyl group and n represents an integer.)

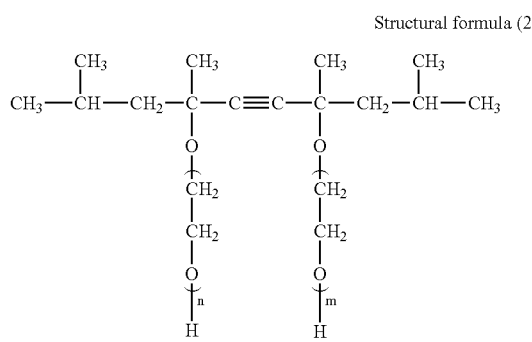

Structural formula (2)

(In the structural formula (2), m and n each represents an integer.)

<Color Ink>

The image forming method according to the present invention is an ink-jet recording method which performs recording on plain paper by the use of a black ink and at least one color ink, and is characterized in that the aqueous ink constituted as described above is used as the black ink, and when forming an image composed of an image formed by the black ink and an image formed by the color ink which are adjacent to each other, performing scanning for applying the black ink to form the image and thereafter performing scanning for applying the color ink to the area where the image has been formed by the precedent scanning is performed.

A color ink in the case where the ink of the present invention is used in only the black ink is described here. In the image forming method according to the present invention, any of conventionally known water base color inks for ink-jet recording may be used.

A coloring material of the color ink may include water-soluble dyes. In particular, it is preferable to use a water-soluble dye having an anionic group as a solubilizing group. The color of the color ink used in the present invention may appropriately be selected from cyan, magenta, yellow, red, green, blue and orange.

The water-soluble dye having an anionic group, used in the present invention, may be any of water-soluble acid dyes, direct dyes and reactive dyes listed in COLOR INDEX, without any particular limitations. Dyes not listed in COLOR INDEX may also be used. In particular, preferably used are those having an anionic group, e.g., a sulfonic group. Any of these dyes may be used in the range of from 1 mass % to 10 mass %, and preferably from 1 mass % to 5 mass %, in the ink Specific dyes may include the following:

C.I. Direct Yellow 8, 11, 12, 27, 28, 33, 39, 44, 50, 58, 85, 86, 87, 88, 98, 100, 110;

C.I. Direct Red 2, 4, 9, 11, 20, 23, 24, 31, 39, 46, 62, 75, 79, 80, 83, 89, 95, 197, 201, 218, 220, 224, 225, 226, 227, 228, 230;

C.I. Direct Blue 1, 15, 22, 25, 41, 76, 77, 80, 86, 90, 98, 106, 108, 120, 158, 163, 168, 199, 226;

C.I. Acid Yellow 1, 3, 7, 11, 17, 23, 25, 29, 36, 38, 40, 42, 44, 76, 98, 99;

C.I. Acid Red 6, 8, 9, 13, 14, 18, 26, 27, 32, 35, 42, 51, 52, 80, 83, 87, 89, 92, 94, 106, 114, 115, 133, 134, 145, 158, 198, 249, 265, 289; and C.I. Acid Blue 1, 7, 9, 15, 22, 23, 25, 29, 40, 43, 59, 62, 74, 78, 80, 90, 100, 102, 104, 117, 127, 138, 158, 161.

The coloring material of the color ink may include, besides the above water-soluble dyes the following 1 to 3. These coloring materials are preferable because they exhibit good water resistance when applied to the recording medium.

1. Dyes having a carboxyl group as a solubilizing group.
2. Oil-soluble dyes.
3. Pigments.

There are no particular limitations concerning the oil-soluble dyes as long as they are those listed in COLOR INDEX. There are also no particular limitations even where they are novel dyes not listed in COLOR INDEX. Specifically, they may include the following. Any of these dyes may be used in the range of from 1 mass % to 10 mass %, and preferably from 1 mass % to 5 mass %, in the ink.

C.I. Solvent Yellow 1, 49, 62, 74, 79, 82, 83, 89, 90, 120, 121, 151, 153, 154;

C.I. Solvent Red 25, 31, 86, 92, 97, 118, 132, 160, 186, 187, 219; and

C.I. Solvent Blue 33, 38, 42, 45, 53, 65, 67, 70, 104, 114, 115, 135.

Where a pigment is used as the coloring material of the color ink, the pigment may preferably be in a content ranging from 1 mass % to 20 mass %, and more preferably from 2 mass % to 12 mass %, based on the total mass of the ink. The pigment usable for the color ink in the present invention may include the following. Of course, in the present invention examples are by no means limited to these. Pigments produced newly for the present invention may also be used, as a matter of course.

C.I. Pigment Yellow 1, 2, 3, 13, 16, 74, 83, 128;

C.I. Pigment Red 5, 7, 12, 48(Ca), 48(Mn), 57(Ca), 112, 122;

C.I. Pigment Blue 1, 2, 3, 15:3, 16, 22; and

C.I. Vat Blue 4, 6.

In the case where the pigment is used as the coloring material of the color ink, as for a dispersing agent used for dispersing the pigment in the ink, there are no particular limitations as long as it is a water-soluble resin. It may preferably be one having weight-average molecular weight in the range of from 1,000 to 30,000, and more preferably in the range of from 3,000 to 15,000.

Such a dispersing agent may include block copolymers, random copolymers and graft copolymers, or salts of these, composed of two monomers (at least one of which is a hydrophilic monomer) selected from styrene, styrene derivatives, vinyl naphthalene, vinyl naphthalene derivatives, aliphatic alcohol esters of α,β-ethylenic unsaturated carboxylic acids acrylic acid, acrylic acid derivatives, maleic acid, maleic acid derivatives, itaconic acid, itaconic acid derivatives, fumaric acid, fumaric acid derivatives, vinyl acetate, vinyl pyrrolidone, acryl amide and derivatives thereof, and so forth. Natural resins such as rosin, shellac and starch may also preferably be used. These resins are soluble in an aqueous solution in which a base has been dissolved, and are alkali-soluble resins. In addition, any of these a water-soluble resins may be in a content ranging from 0.1 mass % to 5.0 mass % based on the total mass of the ink.

The aqueous medium used in the color ink is water or a mixed solvent of water and a water-soluble organic solvent. As the water, it is preferable to use ion-exchanged water (deionized water) rather than normal water containing various ions.

As specific examples of the water-soluble organic solvent, it may specifically include, e.g., alkyl alcohols having 1 to 4 carbon atoms such as methyl alcohol, ethyl alcohol, n-propyl alcohol, isopropyl alcohol, n-butyl alcohol, sec-butyl alcohol and tert-butyl alcohol; amides such as dimethylformamide and diethylacetamide; ketones or ketoalcohols such as acetone and diacetone alcohol; ethers such as tetrahydrofuran and dioxane; polyalkylene glycols such as polyethylene glycol and polypropylene glycol; alkylene glycols whose alkylene groups have 2 to 6 carbon atoms, such as ethylene glycol, propylene glycol, butylene glycol, triethylene glycol, 1,2,6-hexanetriol, thiodiglycol, hexylene glycol and diethylene glycol; glycerol; lower alkyl ethers of polyhydric alcohols, such as ethylene glycol monomethyl(or ethyl) ether, diethylene glycol methyl(or ethyl) ether and triethylene glycol monomethyl(or ethyl) ether; and N-methyl-2-pyrrolidone, 2-pyrrolidone, and 1,3-dimethyl-2-imidazolidinone. Of these water-soluble organic solvents, the following are particularly preferred: polyhydric alcohols such as diethylene glycol, and lower alkyl ethers of polyhydric alcohols, such as ethylene glycol monomethyl(or ethyl) ether.

The water-soluble organic solvent in the color ink may preferably be in a content ranging from 3 mass % to 50 mass %, and more preferably ranging from 3 mass % to 40 mass %, based on the total mass of the ink. Also, the water may preferably be in a content ranging from 10 mass % to 90 mass %, and more preferably ranging from 30 mass % to 80 mass %, based on the total mass of the ink.

To the color ink(s) used in the present invention, besides the above components, a surfactant, an anti-foaming agent, an antiseptic agent and so forth may optionally appropriately be added in order to make up an ink having the desired values of physical properties

[Physical Properties of Ink]

The black ink and color ink(s) used in the present invention, composed of the constituents as described above, may preferably have properties that enable them to be suitably ejected from an ink-jet recording head. From the viewpoint of the performance of ejection from the ink-jet recording head, each ink may preferably be 1 to 15 mPa/s and 25 mN/m or more in surface tension, and more preferably 1 to 5 mPa/s and 25 mN/m to 50 mN/m or more in surface tension. Also, where the black ink and the color ink(s) are used in combination, it is further preferable that the surface tension of the color ink(s) is lower than the surface tension of the black ink. Specifically, it is preferable that the black ink has a surface tension of from 35 to 50 mN/m and the color ink(s) has/have a surface tension of from 25 to 35 mN/m.

<Reaction Liquid>

The reaction liquid usable in the present invention contains a reactive component having the function to make the dispersion state of the coloring material in the ink unstable. The reactive component lowers the dispersion stability of the coloring material and causes the coloring material to flocculate when the ink in which the coloring material is dispersed or dissolved in the aqueous medium by the action of ionic groups comes into contact with the above reactive component on the recording medium. In addition, making the dispersion state of the coloring material in the ink unstable means that the state of flocculation or gelation is brought about when the ink and the reaction liquid are mixed on the recording medium.

As specific examples of the reactive component, it may include metal salts (in particular, polyvalent-metal ions and salts thereof), low-molecular cationic compounds, and cationic high polymers. The reactive component is described below.

[Polyvalent-Metal Ion and Salt thereof]

The polyvalent-metal ions may specifically include, e.g., divalent-metal ions such as $Ca^{2+}$, $Cu^{2+}$, $Ni^{2+}$, $Mg^{2+}$, $Zn^{2+}$, $Sr^{2+}$ and $Ba^{2+}$ and trivalent-metal ions such as $Al^{3+}$, $Fe^{3+}$, $Cr^{3+}$ and $Y^{3+}$. To incorporate the polyvalent-metal ions in the reaction liquid a method is available in which a salt of a polyvalent metal is added to the reaction liquid. The salt refers to metal salts constituted of the above polyvalent-metal ions and anions bonded thereto, and must be soluble in water. Preferred anions for forming the salt may include, e.g., $Cl^-$, $NO_3^-$, $I^-$, $Br^-$, $ClO_3^-$, $SO_4^{2-}$, $CO_3^{2-}$, $CH_3COO^-$ and $HCOO^-$. Of course, in the present invention, examples are by no means limited to these. In the present invention, in view of the reactivity of the reaction liquid with the aqueous ink, the coloring performance and further the readiness of handling the reaction liquid, the polyvalent-metal ions may preferably include $Ca^{2+}$, $Mg^{2+}$, $Sr^{2+}$, $Al^3$ and $Y^3$. Further, $Ca^{2+}$ is particularly preferred. Also, as to the anions, $NO_3^-$ is particularly preferred in view of solubility and so forth.

In the reaction liquid, the polyvalent-metal ions may preferably be in a content of from 0.01 mass % or more to 10 mass % or less, and more preferably from 1.0 mass % or more to 5 mass % or less, based on the total mass of the reaction liquid, taking into account the effect to be brought about by the present invention. In particular, in order to sufficiently exhibiting the function of making the dispersion state of the coloring material contained in the aqueous ink unstable and to achieve image density at a high level the polyvalent-metal ions may preferably be in a content of from 2.0 mass % or more to 4.0 mass % or less based on the total mass of the reaction liquid. In addition, the content of the polyvalent-metal ions in the reaction liquid may be more than 10 mass %. However, its excessive incorporation is usually unnecessary because, e.g., even if its content is more than 10 mass %, the function of making the dispersion state of he coloring material unstable is not expected to be enhanced.

The reaction liquid may preferably contain no coloring material and be transparent. It, however, is not always necessary that the reaction liquid is one showing no absorption in the visible region. More specifically, even if it shows absorption in the visible region, it may be usable as long as such absorption does not affect substantially images.

[Reaction Liquid Application Means]

As methods for applying the reaction liquid to the recording medium, coating methods such as roller coating, bar coating and spray coating are available. A method is also available in which, using an ink-jet recording method as in the case of the ink, the reaction liquid is adhered selectively to only image forming areas to which the ink is to be adhered and the vicinities of the image forming areas. As a result of studies made by the present inventors on how to apply the reaction liquid to the recording medium, they have reached such a finding that the roller coating is the best. This is because, even where the reaction liquid is applied in a small quantity, the distribution state of the reactive component in the vicinity of the recording medium surface layer portion is more uniform than that in other means, and further because image quality can be superior as being free of non-uniformity at solid areas and also strike-through after the ink has been applied.

Where images are formed using the two-liquid system various methods are available for a means by which the reaction liquid and the aqueous ink are brought into contact with each other on the recording medium. However, the present inventors have reached such a conclusion that, in order to obtain the effect of the present invention more remarkably, a method is the best in which the aqueous ink is applied to the recording medium after fixing of the reaction liquid to the recording medium has been completed, i.e., after the droplets of the reaction liquid have been absorbed into the recording medium.

In addition, a time point at which the fixing is completed refers to a time point at which the value of Ka $(t-t_w)^{1/2}$ represented by the Bristow's equation is larger than the quantity of the reaction liquid applied actually to the recording medium. This refers to a time point at which the droplets of the reaction liquid are absorbed into the recording medium, and means "t-second after" as calculated from the Ka value according to the Bristow method and the quantity of the reaction liquid.

[Physical Properties and Application Amount of Reaction Liquid]

It is preferable that the permeability of the reaction liquid into recording medium is from 1.3 mL/m$^{-2}$/msec$^{-1/2}$ or more to 6.0 mL/m$^{-2}$/msec$^{1/2}$ or less, and more preferably from 3.0 mL/m$^{-2}$/msec$^{-1/2}$ or more to 6.0 mL/m$^{-2}$/msec$^{-1/2}$ or less, in terms of the Ka value found by the Bristow method. Also, the reaction liquid may preferably be applied in a application amount of from 0.5 g/m$^2$ or more to 5 g/m$^2$ or less, and more preferably from more than 2.0 g/m$^2$ to 3.0 g/m$^2$ or less.

In addition, the amount of application of the reaction liquid may appropriately be adjusted by controlling the physical properties of the reaction liquid, the rotational speed of a roller used in a coating assembly, the contact pressure of the roller with the recording medium, and so forth.

<Image Forming Method>

The image forming method according to the present invention is described below by giving specific examples. The image forming method according to the present invention is an image forming method which performs recording by an ink-jet recording system on a recording medium such as plain paper by the use of a black ink and at least one color ink, and is characterized in that the aqueous ink constituted as described above is used as the black ink, and when forming an image composed of an image formed by the black ink and an image formed by the above color ink which are adjacent to each other, performing scanning for applying the black ink to form the image and thereafter performing scanning for applying the color ink to the area where the image has been formed by the precedent scanning. Specific methods therefore are described below.

Figure 8:
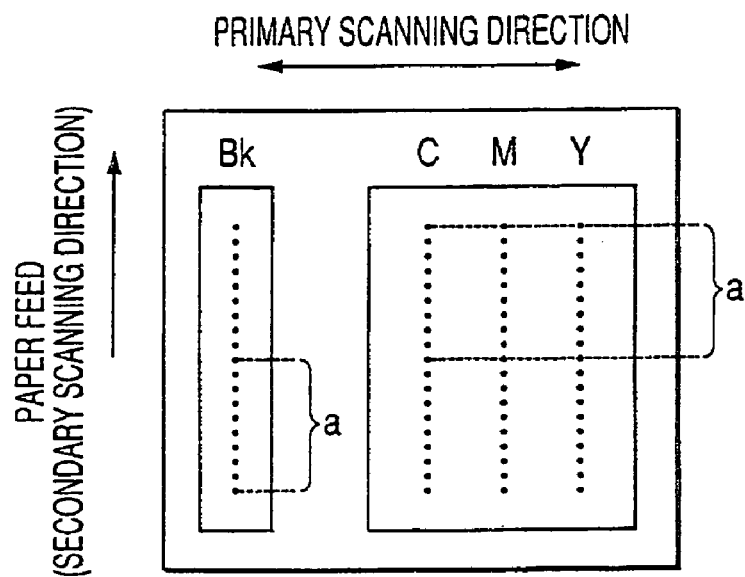
FIG. 8 is a view showing an example of the construction of a recording head.

FIG. 8 shows an example of a recording head used when the image forming method according to the present invention is carried out. The recording head has, as shown in FIG. 8, an ejection orifice line Bk for ejecting a black ink therefrom, and ejection orifice lines C, M and Y for ejecting therefrom three color inks of cyan (C), magenta (M) and yellow (Y), respectively.

In the image forming method of the present invention, where full-color images are formed, a recording head may preferably be used in which the inks are applied by use of a recording head in which an ejection orifice line for ejecting a black ink therefrom and an ejection orifice lines for ejecting color ink therefrom are placed to be shifted from each other in a secondary scanning direction. Specifically, for example, in carrying out the image forming method by using the recording head shown in FIG. 8, the whole area of the black ink ejection orifice line is used when only black images are formed. When full-color images with black images and color images intermixed are formed, images may preferably be so formed that the black ink uses a part a of the black ink ejection orifice line and the C, M and Y color inks use a part b of the color ink ejection orifice lines. The case in which the images with black images and color images intermixed are formed is described below in greater detail.

FIG. 8 shows an example of a recording head usable in the present invention. The recording head has the ejection orifice line Bk for ejecting a black ink therefrom, and the ejection orifice lines C, M and Y for ejecting therefrom three color inks of cyan (C), magenta (M) and yellow (Y), respectively. First, using the part a of the black ink ejection orifice line, the printing head is scanned in the horizontal direction in the drawing (the primary scanning direction) to form a black image in one-pass printing on the recording medium. Next, the recording medium is transported by the distance a in the vertical direction in the drawing (the secondary scanning direction), where, in the course of the next primary scanning in the forward direction in the printing head, the part b of the color ink ejection orifice lines is used to form a color image in one-pass printing on the recording medium in its image area formed at the former part a of the black ink ejection orifice line Here, the part a of the black ink ejection orifice line is forming an image in the next area. This is repeated to form the images with black images and color images intermixed.

Figure 9:
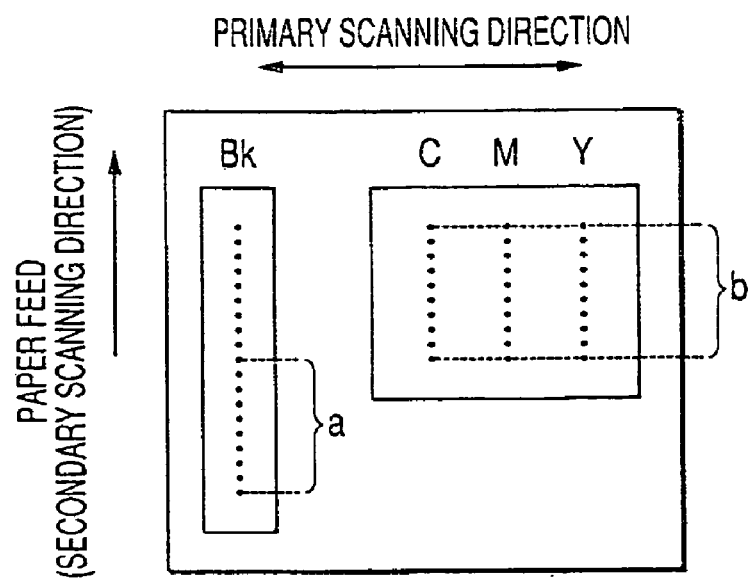
FIG. 9 is a View showing an example of the construction of a recording head.

FIG. 9 shows another example of a recording head usable in the present invention. In what is shown in FIG. 9 as well, as in the case of FIG. 8, the black ink uses a part a of the black ink ejection orifice line and the C, M and Y color inks use a part b corresponding to the whole area of the color ink ejection orifice lines, forming in the same way as the above the images with black images and color images intermixed.

Figure 10:
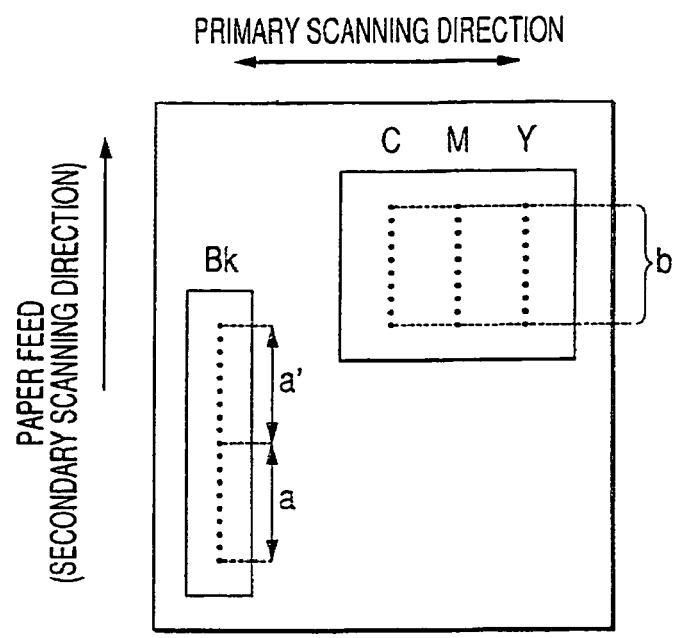
FIG. 10 is a view showing an example of the construction of a recording head.

FIG. 10 shows still another example of a recording head usable in the present invention. In what is shown in FIG. 10 as well, as in the case of FIG. 8, the black ink uses a part a of the black ink ejection orifice line and the C, M and Y color inks use a part b corresponding to the whole area of the color ink ejection orifice lines, forming the images with black images and color images intermixed. Here, in the recording head shown in FIG. 10, a distance for a paper feed a' for one time is placed between the part a of the black ink ejection orifice line and the part b of the color ink ejection orifice lines. Hence, in the recording head thus constructed, it follows that a time difference corresponding to one-time scanning in reciprocation is produced in excess while a black image is formed and thereafter a color image is formed. Thus, the construction of the recording head shown in FIG. 10 is more advantageous than the construction of the recording head shown in FIG. 9, for keeping bleeding from occurring between the black image and the color image.

Figure 11:
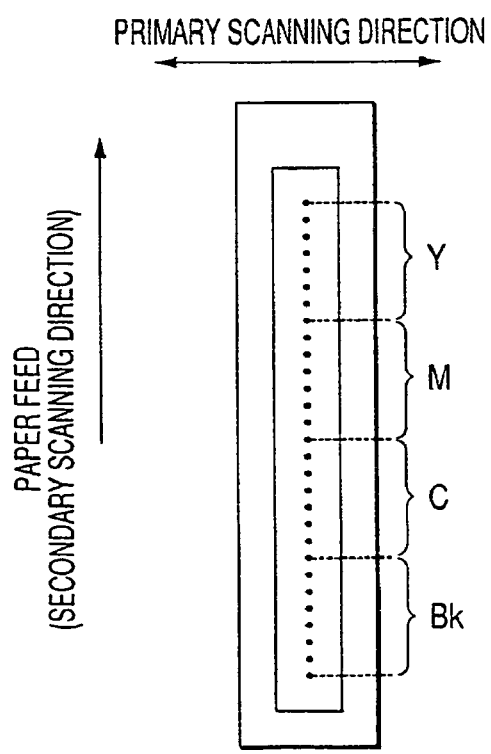

FIG. 11 shows still another example of a recording head usable in the present invention. Where, as in the recording head shown in FIG. 11, a recording head is used in which a black ink ejection orifice line and color ink ejection orifice lines are placed in alignment in order in the secondary scanning direction, the black image is first formed and thereafter the color image is formed in accordance with the feed of paper.

Figure 12:
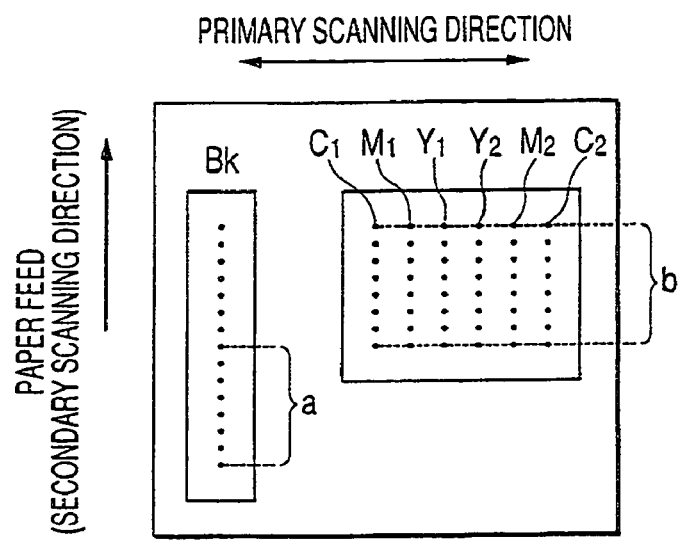
FIG. 12 is a view showing an example of the construction of a recording head.

FIG. 12 shows still another example of a recording head usable in the present invention. In the recording head shown in FIG. 12, color ink ejection orifice lines are symmetrically provided in the primary scanning direction in two files for each cyan ink (C1, C2), magenta ink (M1, M2) and yellow ink (Y1, Y2), so that the ejection order of the color inks is identical in both of the forward and backward directions in the primary scanning. As a result, the images with black images and color images intermixed can be formed in a two-direction printing manner. In this case, first, a part a of the black ink ejection orifice line is used to form the black image, and then the recording medium is transported by the distance a in the secondary scanning direction, where, in the course of moving in the backward direction of the next primary scanning in the printing head, a part b of the color ink ejection orifice lines is used to form a color image in one-pass printing on the recording medium at the image area previously formed by the part a of the black ink ejection orifice line, when the part a of the black ink ejection orifice line is forming an image in the next area. This is repeated to form the images with black images and color images intermixed.

Figure 13:
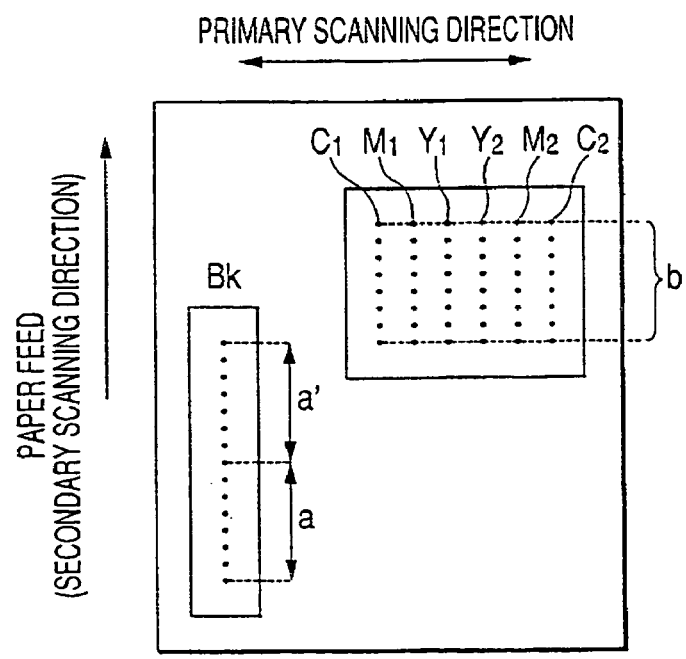
FIG. 13 is a view showing an example of the construction of a recording head.

Also in the recording head adapted to the both-direction printing as in what is shown in FIG. 12, as in the recording head described with reference to FIG. 10, the ink ejection orifice lines may be so placed that a distance for a paper feed a' for one time is placed between the part a of the black ink ejection orifice line and the part b of the color ink ejection orifice lines (see FIG. 13), to provide a time difference corresponding to one-time scanning in reciprocation while the black image is formed and thereafter the color image is formed, thus the recording head is more advantageously constructed to keep bleeding from occurring between the black image and the color image.

The image forming method has been described above. It is a matter of course that the forms of the recording head usable in the image forming method according to the present invention are by no means limited to those shown in FIGS. 8 to 13. Also, the number of passes differs depending on recording apparatus to be used, and hence the printing is by no means limited to the one-pass printing.

Where the images with black images and color images intermixed are formed on plain paper, the aqueous ink according to the present invention may be used in the black ink. With such construction, it is considered that, as stated above, the flocculation or break of dispersion of the pigment constituting the black ink on the paper surface proceeds relatively fast, compared with other inks. In the image forming method in the present invention, the aqueous ink according to the present invention is used in the black ink and also the image formation using the color ink is performed after the image formation using the black ink. More preferably,the color ink is applied by scanning with delay of at least one scanning after application of the black ink by scanning. With such construction, any blurring due to color mixture between the black ink and the color ink does not occur on the paper surface even upon contact with the color ink, whereby images kept effectively from bleeding can be formed. More specifically, the above good effects are obtained only by providing a time difference between the image formation using the black ink and the image formation using the color ink, without requiring a method of performing multi-pass printing which takes a printing time for completing the printing through scanning carried out in a plurality of times, or a method which brings about large-sized equipment such that a restoration system is separately provided for each of the black ink and the color ink.

The use of the aqueous ink according to the present invention also enables the pigment in the ink to remain efficiently on the recording medium for the reasons stated previously, and hence makes it possible to perform high-density printing in a smaller ink quantity than the ejection quantity (droplet volume) of conventional inks. Moreover, since the printing can be performed in a small ink quantity, costs for image formation can be reduced and the ink can be fixed in a shorter time than conventional inks. Such effects can also be expected.

<Ink-jet Recording Method, Recording Unit, Cartridge and Recording Apparatus>

Figure 2:
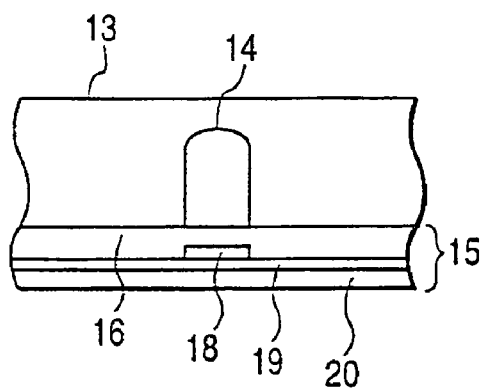
FIG. 2 is a vertical section of a recording head.

An example of an ink-jet recording apparatus preferable in the present invention is described next. First, an example of the construction of a recording head is shown in FIGS. 1 and 2 which is the main constituent of an ink-jet recording apparatus which utilizes heat energy. FIG. 1 is a cross-sectional view of a recording head 13 along its ink channel, and FIG. 2 is a cross-sectional view along the line A-B in FIG. 1. The recording head 13 is made up by bonding glass, ceramic or plastic plates or the like having channels (nozzle) 14 through which the ink is passed, to a heating element substrate member 15.

The heating element substrate member 15 is constituted of a protective layer 16 formed of silicon oxide, silicon nitride, silicon carbide or the like, electrodes 17-1 and 17-2 formed of aluminum, gold, aluminum-copper alloy or the like, a heating resistor layer 18 formed of a high-melting material such as HfB2, TaN or TaAl, a heat accumulating layer 19 formed of thermally oxidized silicon, aluminum oxide or the like, and a substrate 20 formed of a material having good heat dissipation properties, such as silicon, aluminum or aluminum nitride.

Upon application of pulsewise electric signals to the electrodes 17-1 and 17-2 of the recording head 13, heat is abruptly generated at the region denoted by n in the heating resistor substrate member 15, so that bubbles are generated in ink 21 coming into contact with the surface of this region. The pressure thus produced thrusts out a meniscus 23 and the ink 21 is ejected through the nozzle 14 from an ejection orifice 22 in the form of a minute ink drop 24 to fly toward a recording medium 25.

Figure 3:
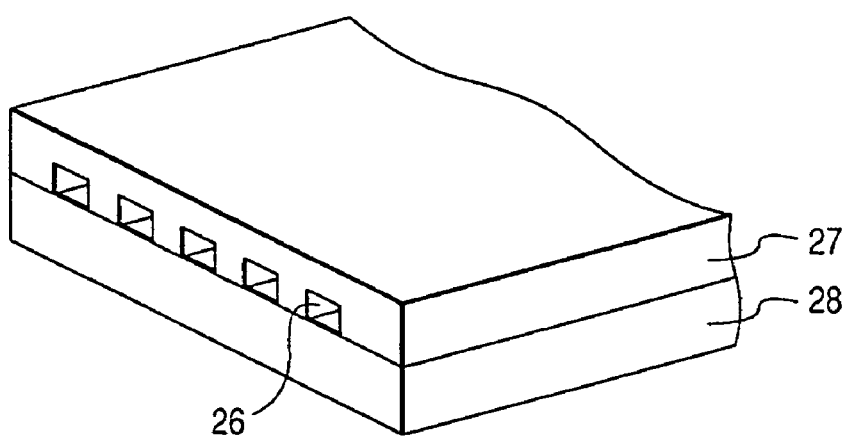
FIG. 3 is a perspective view of the external appearance of a recording head in which the recording head shown in FIG. 1 is set in multiple mode.

FIG. 3 shows external appearance of an example of a multi-head comprising the recording heads shown in FIG. 1, arranged in a large number. This multi-head is prepared by bonding a glass plate 27 having a multi-nozzle 26 to a heating head 28 similar to what is illustrated in FIG. 1.

Figure 4:
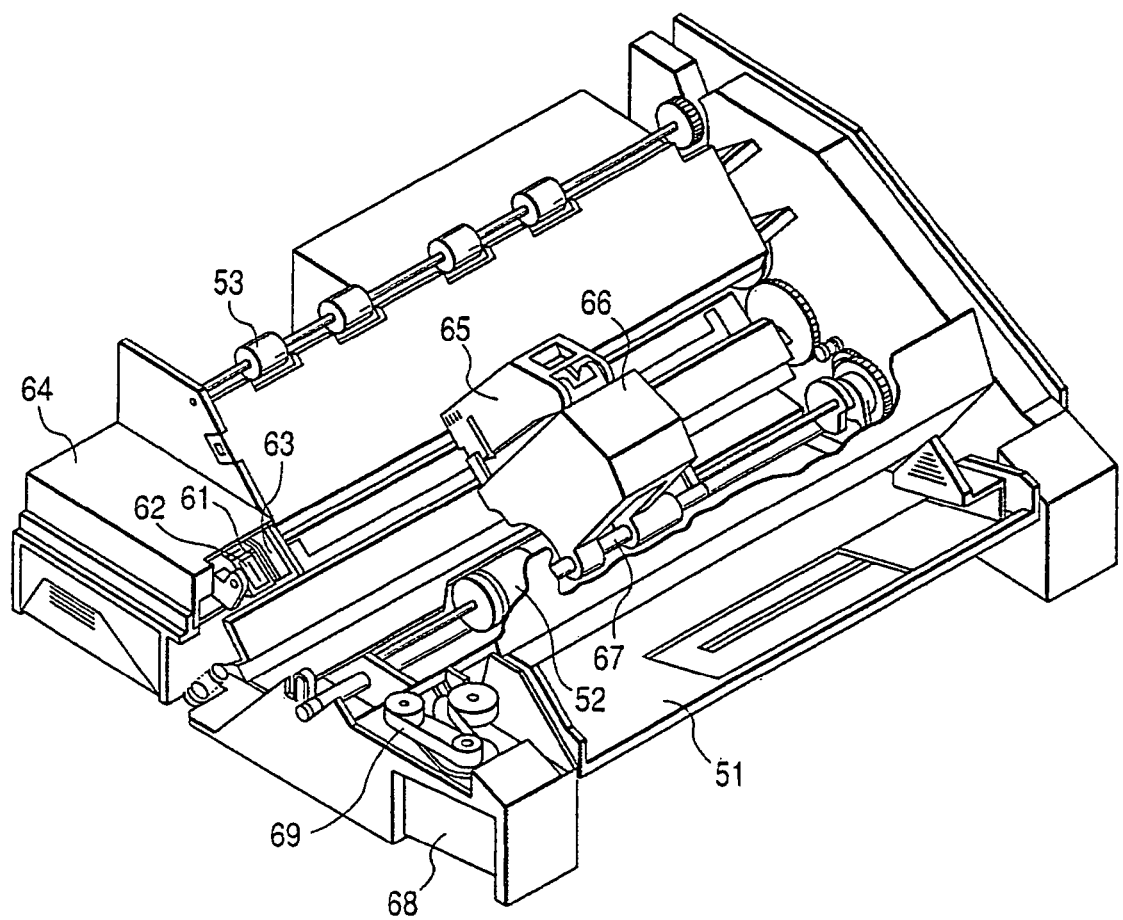
FIG. 4 is a perspective view showing an example of an ink-jet recording apparatus.

FIG. 4 shows an example of the ink-jet recording apparatus in which such a recording head installed. In FIG. 4, reference numeral 61 denotes a blade serving as a wiping member, which is in the form of a cantilever one end of which is a stationary end retained by a blade-retaining member. The blade 61 is set at the position adjacent to the region in which a recording head 65 makes a record. Also, in the example shown in the drawing, the blade 61 is retained in such a form that it projects to the course through which the recording head 65 is moved.

Reference numeral 62 denotes a cap for the face of the ink ejection orifices of the recording head 65, which is provided at the home position adjacent to the blade 61, and is so constructed that it moves in the direction perpendicular to the direction in which the recording head is moved and comes into contact with the face of ink ejection orifices to carry out capping. Also, reference numeral 63 denotes an ink absorber provided adjacent to the blade 61, and as in the blade 61, is retained in such a form that it projects to the course through which thee recording head 65 is moved. The above blade 61, cap 62 and absorber 63 constitute an ejection restoration assembly 64 where the blade 61 and the absorber 63 remove water, dust and so forth from the ink ejection orifice face.

Reference numeral 65 denotes the recording head having an ejection energy generating means and ejects ink to the recording medium set opposite to the ejection orifice face provided with ejection orifices, to carry out recording. Reference numeral 66 denotes a carriage on which the recording head 65 is mounted so that the recording head 65 can be moved. The carriage 66 is slidably associated with a guide shaft 67. Part of the carriage 66 is connected (not shown) with a belt 69 driven by a motor 68. Thus, the carriage 66 can be moved along a guide shaft 67 and hence the recording head 65 can be moved from a recording region to a region adjacent thereto.

Reference numeral 51 denotes a feeding part from which recording mediums are inserted, and 52, a paper feed roller driven by a motor (not shown). With such construction, the recording medium is fed to the position opposite to the ejection orifice face of the recording head 65, and with progress of recording, discharged to a paper delivery section provided with a paper delivery roller 53.

In the above construction, the cap 62 of the ejection restoration assembly 64 is withdrawing from the moving course of the recording head 65 when the recording head 65 is returned to its home position after completion of recording, and the blade 61 is projected to the moving course. As a result, the ejection orifice face of the recording head 65 is wiped.

In addition, when the cap 62 comes into contact with the ejection orifice face of the recording head 65 to carry out capping, the cap 62 is moved in such a way that it projects to the moving course of the recording head. When the recording head 65 is moved from its home position to the position at which the recording is started, the cap 62 and the blade 61 are at the same position as the above position where the ejection orifice face is wiped. As a result, the ejection orifice face of the recording head 65 is wiped also at the time of this movement.

The above movement of the recording head to its home position is carried out at the time of the completion of recording or restoration of ejection, and besides, the recording head is moved to the home position adjacent to each recording region at given intervals while moving the recording region for the purpose of recording, where the ejection orifice face is wiped in accordance with this movement.

Figure 5:
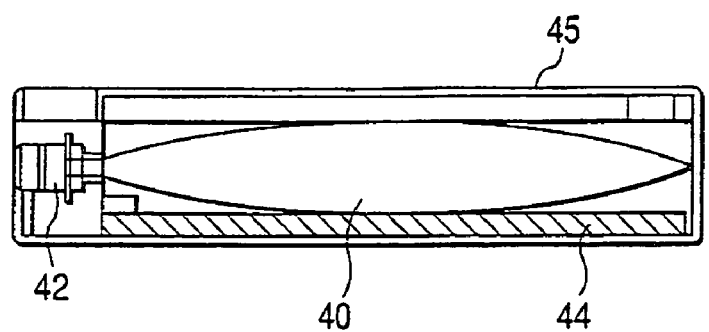
FIG. 5 is a vertical section of an ink cartridge.

FIG. 5 is a view showing an example of an ink cartridge that holds the ink fed to the recording head through an ink-feeding member, e.g., a tube. Here, reference numeral 40 denotes an ink holder, e.g., an ink bag, that holds the feeding ink. The top thereof is provided with a stopper 42 made of rubber. A needle (not shown) may be inserted to this stopper 42 so that the ink in the ink bag 40 can be fed to the head. Reference numeral 44 denotes an absorber that receives used ink. It is preferable for the ink holder to be formed of a polyolefin, particularly polyethylene, at its face coming into liquid contact with ink.

Figure 6:
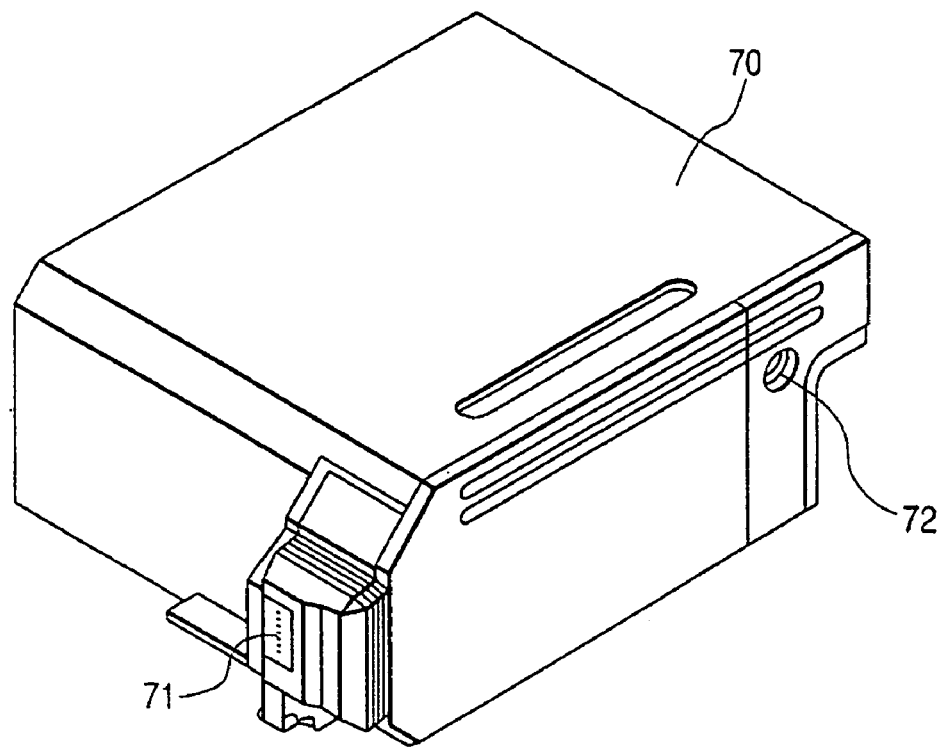
FIG. 6 is a perspective view showing an example of a recording unit.

The ink-jet recording apparatus used in the present invention is not limited to the apparatuses described above in which the head and the ink cartridge are separately provided and is preferably usable also in a device in which these are integrally formed as shown in FIG. 6. In FIG. 6, reference numeral 70 denotes a recording unit, in which an ink holder with ink held therein, e.g., an ink absorber, is placed. The recording unit is so constructed that the ink in such an ink absorber is ejected in the form of ink droplets from a head 71 having a plurality of orifices. As a material for the ink absorber, polyurethane may preferably be used. In place of the ink absorber, the recording unit may be so constructed that the ink holder is an ink bag internally provided with a spring or the like. Reference numeral 72 denotes an air path opening through which the interior of the cartridge is communicated with the atmosphere. This recording unit 70 is one used in place of the recording head 65 shown in FIG. 4, and is detachably mountable to the carriage 66.

A preferable example of an ink-jet recording apparatus utilizing mechanical energy is described below. The ink-jet recording apparatus utilizing mechanical energy may include an on-demand ink-jet recording head which is provided with a nozzle-formed substrate having a plurality of nozzles, a pressure generating device composed of a piezoelectric material and a conductive material, provided opposite to the nozzles, and an ink with which the surrounding of the pressure generating device is filled, and in which the pressure generating device is made to undergo displacement by an applied voltage to eject minute ink drops from the nozzles. An example of the construction of the recording head, which is the main constituent of the apparatus, is shown in FIG. 7.

The recording head is constituted of an ink channel 80 communicating with an ink chamber (not shown), an orifice plate 81 for ejecting ink droplets with desired volume, a vibrating plate 82 that causes a pressure to directly act on ink, a piezoelectric device 83 that is joined to this vibrating plate 82 and is made to undergo displacement according to electric signals, and a substrate 84 for supporting and fixing the orifice plate 81, the vibrating plate 82 and so forth.

Figure 7:
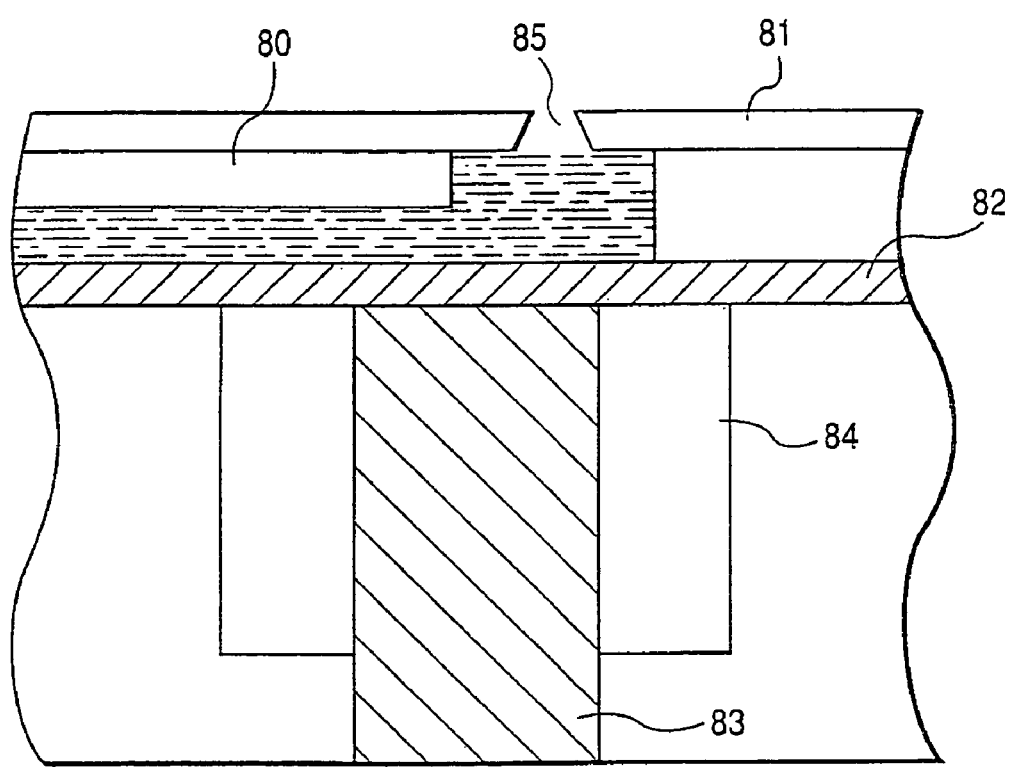
FIG. 7 is a view showing an example of the construction of a recording head.

In FIG. 7, the ink channel 80 is formed from a photosensitive resin or the like, and the orifice plate 81 is made of a metal such as stainless steel or nickel, and is provided with an ejection orifice 85 formed by making a hole by means of electroforming or pressing. The vibrating plate 82 is formed out of a metal film of stainless steel, nickel, titanium or the like, and a highly resilient resin. The piezoelectric device 83 is formed of a dielectric material such as barium titanate or PZT (Pb—Zr—Ti).

The recording head constituted as described above operates as follows: A pulsewise voltage is applied to the piezoelectric device 83 to produce a strain stress, the energy thus produced changes the form of the vibrating plate jointed to the piezoelectric device 83, and the ink inside the ink channel 80 is vertically pressed, so that ink droplets (not shown) are ejected from the ejection orifice 85 of the orifice plate 81 to make a record. Such a recording head is used in the state it is incorporated into the same ink-jet recording apparatus as shown in FIG. 4. Individual parts of the ink-jet recording apparatus may operate in the same manner as described above.

EXAMPLES

Hereinafter, the present invention will be described more specifically by way of examples, comparative examples and reference examples. However, the present invention is not limited by the following examples. In the following description, unless otherwise stated, "part(s)" and "%" mean "part(s) by mass" and "mass %".

(Preparation of Pigment Dispersion Solutions)
[Preparation of Pigment Dispersion Solution A]
1.55 g of p-aminobenzoic acid was added at 5° C. to a solution of 5 g of concentrated hydrochloric acid dissolved in 5.5 g of water. This solution was stirred in an ice bath to be always maintained at 10° C. or less and a solution of 1.8 g of sodium nitrite dissolved in 9 g of 5° C. water was added to this solution. After the resulting solution was further stirred for 15 minutes, 6 g of carbon black having a specific surface area of 220 m$^2$/g and a DBP oil absorption of 105 mL/100 g was added and mixed. Thereafter, the solution was stirred for another 15 minutes. The obtained slurry was filtered with a paper filter (trade name: Standard Filter Paper No. 2, available from ADVANTEC), and pigment particles were thoroughly washed with water and dried in an oven heated at 110° C. to prepare self-dispersion carbon black A.

Water was added to the obtained self-dispersion carbon black A to prepare a dispersion solution having a pigment concentration of 10 mass %. With the above process, a pigment dispersion solution A in which the self-dispersion carbon black A (Pigment A) having —C$_6$H$_4$—COONa group introduced to the surface of carbon black was dispersed in the water was obtained.

The ionic group density of the prepared self-dispersion carbon black A was measured, and it was 2.6 μmol/m$^2$. In the measurement of the ionic group density, ion meter (manufactured by Toa DKK) was used to measure the sodium ion concentration in the above pigment dispersion solution A, and the obtained result was converted into the ionic group density of the self-dispersion carbon black A.

[Preparation of Pigment Dispersion Solution B]

1.5 g of 4-aminophthalic acid was added to a solution of 5 g of concentrated hydrochloric acid dissolved in 5.5 g of water. This solution was stirred in an ice bath to be always maintained at 10° C. or less and a solution of 1.8 g of sodium nitrite dissolved in 9 g of 5° C. water was added to this solution. After the resulting solution was further stirred for 15 minutes, 6 g of carbon black having a specific surface area of 220 m$^2$/g and a DBP oil absorption of 105 mL/100 g was added and mixed. Thereafter, this solution was stirred for another 15 minutes. The obtained slurry was filtered with a paper filter (trade name: Standard Filter Paper No. 2, available from ADVANTEC), and pigment particles were thoroughly washed with water and dried in an oven heated at 110° C. to prepare self-dispersion carbon black B.

Water was added to the obtained self-dispersion carbon black B to prepare a dispersion solution having a pigment concentration of 10 mass %. With the above process, a pigment dispersion solution B in which the self-dispersion carbon black B (Pigment B) having —C$_6$H$_3$—(COONa)$_2$ group introduced to the surface of carbon black was dispersed in the water was obtained.

The ionic group density of the prepared self-dispersion carbon black B was measured in the same manner as that of self-dispersion carbon black A and it was 3.1 μmol/m$^2$.

[Preparation of Pigment Dispersion Solution C]

1.55 g of p-aminobenzoic acid was added a solution of 2.5 g of concentrated hydrochloric acid dissolved in 5.5 g of water. This solution was stirred in an ice-bath to be always maintained at 10° C. or less and a solution of 0.9 g of sodium nitrite dissolved in 9 g of 5° C. water was added to this solution. After the resulting solution was further stirred for 15 minutes, 9 g of carbon black having a specific surface area of 220 m$^2$/g and a DBP oil absorption of 105 mL/100 g was added and mixed. Thereafter, this solution was stirred for another 15 minutes. The obtained slurry was filtered with a paper filter (trade name: Standard Filter Paper No. 2, available from ADVANTEC), and pigment particles were thoroughly washed with water and dried in an oven heated at 110° C. to prepare self-dispersion carbon black C.

Water was added to the obtained self-dispersion carbon black C to prepare a dispersion solution having a pigment concentration of 10 mass %. With the above process, a pigment dispersion solution C in which the self-dispersion carbon black C (Pigment C) having —C$_6$H$_4$—COONa group introduced to the surface of carbon black was dispersed in the water was obtained.

The ionic group density of the prepared self-dispersion carbon black C was measured in the same manner as that of self-dispersion carbon black A and it was 1.0 μmol/m$^2$.

[Preparation of Pigment Dispersion Solution D]

0.7 g of 4-aminophthalic acid was added to a solution of 2.5 g of concentrated hydrochloric acid dissolved in 5.5 g of water. This solution was stirred in an ice bath to be always maintained at 10° C. or less and a solution of 0.9 g of sodium nitrite dissolved in 9 g of 5° C. water was added to this solution. After the resulting solution was further stirred for 15 minutes, 10 g of carbon black having a specific surface area of 220 m$^2$/g and a DBP oil absorption of 105 mL/100 g was added and mixed. Thereafter, this solution was stirred for another 15 minutes. The obtained slurry was filtered with a paper filter (tradename: Standard Filter Paper No. 2, available from ADVANTEC), and pigment particles were thoroughly washed with water and dried in an oven heated at 110° C. to prepare self-dispersion carbon black D.

Water was added to the obtained self-dispersion carbon black D to prepare a dispersion solution having a pigment concentration of 10 mass %. With the above process, a pigment dispersion solution D in which the self-dispersion carbon black D (Pigment D) having —C$_6$H$_3$—(COONa)$_2$ group introduced to the surface of carbon black was dispersed in the water was obtained.

The ionic group density of the prepared self-dispersion carbon black D was measured in the same manner as that of self-dispersion carbon black A and it was 1.4 μmol/m$^2$.

[Judgment on Good Medium/Poor Medium of Water-soluble Organic Solvent]

The following experiment was conducted in order to select the water-soluble organic solvent acting as the good medium or poor medium for the pigment contained in the above pigment dispersion solution. First, the pigment dispersion solution A to D having a solid content concentration of 10 mass % were used to prepare aqueous solutions. These aqueous solutions and respective water-soluble organic solvents were used to prepare solvent-judgment dispersion solution A and solvent-judgment water dispersion solution B for judgment on good medium/poor medium according to the following mixing ratios.

| [Mixing ratios of dispersion solutions for judgment on good medium/poor medium] | |
|---|---|
| (Solvent-judgment dispersion solution A) | |
| each pigment dispersion solution with solid content concentration of 10 mass % | 50 parts |
| each water-soluble organic solvent shown in Table 1 | 50 parts |
| (Solvent- judgment water dispersion solution B) | |
| each pigment dispersion solution with solid content concentration of 10 mass % | 50 parts |
| pure water | 50 parts |

Next, 10 g of the each dispersion solution A for judgment on good medium/poor medium which was prepared as described above was put into a transparent glass sample bottle with a cap, and the bottle was closed with the cap. Thereafter, its contents were thoroughly stirred, and this was left standing for 48 hours in a 60° C. oven. Thereafter, the dispersion solution taken out of the 60° C. oven was used as a sample for measurement, and the average particle size of the pigment in the pigment dispersion solution was measured with a fiber-optics particle analyzer (trade name: FPAR-1000; manufactured by Otsuka Electronics Co., Ltd.). The value obtained was defined as the average particle size of the pigment indispersion solution A for judgment (pigment average particle size measured without dilution). Meanwhile, water dispersion solution B for Judgment was not stored with heating, and the average particle size of the pigment in this dispersion was measured with a fiber-optics particle analyzer. Then, in regard to the average particle sizes in solvent-judgment dispersion solution A and solvent-judgment water dispersion solution B, when the average particle size in dispersion solution A was larger than that in water dispersion solution B, the water-soluble organic solvent was judged to be a poor medium, and when the average particle size in dispersion solution A was equal to or smaller than that in water dispersion solution B, the water-soluble organic solvent was judged to be a good medium.

[Measurement of Ka Value on Water-soluble Organic Solvent]

First, to measure the Ka value of each water-soluble organic solvent, an aqueous dye solution with a dye concentration of 0.5 mass %, having composition shown below, was prepared. Such an aqueous dye solution is used in order to color a colorless transparent sample to make it visible so that the Ka value can be easily measured.

| water-soluble dye C.I. Pigment Blue 199 | 0.5 part |
|---|---|
| pure water | 99.5 parts |

Next, using this aqueous 0.5 mass % dye solution and each water-soluble organic solvent to be measured, each of aqueous 20% solution of colored water-soluble organic solvents having the composition shown below was prepared.

| above aqueous 0.5 mass % dye solution | 80 parts |
|---|---|
| water-soluble organic solvent shown in Table 1 | 20 parts |

Using as a measuring sample the aqueous 20 mass % solution of each colored water-soluble organic solvent, prepared as described above, the Ka value of the aqueous 20 mass % solution of each water-soluble organic solvent was measured by the Bristow method using a dynamic permeability tester (trade name: Dynamic Permeability Tester S; manufactured by Toyo Seiki Seisaku-sho, Ltd.).

[Results of Judgment and Measurement]

In respect of the water-soluble organic solvents usable in the ink, measured as described above, the results of judgment on whether they were good mediums or poor mediums for Pigment dispersion solutions A to D and the results of measurement of the Ka value in the aqueous 20% solution of each water-soluble organic solvent are shown in Table 1. In addition, letter symbols "O" and "X" in the table stand for good medium and poor medium, respectively.

TABLE 1

| Water-soluble organic solvent | Pigment dispersion Solution | | | | Ka value of 20 mass % solution |
|---|---|---|---|---|---|
| | A | B | C | D | (ml/m$^2$/msec$^{1/2}$) |
| Polyethylene glycol 600 | X | X | X | X | 0.17 |
| Glycerol | O | O | O | O | 0.13 |
| Trimethylolpropane | O | O | O | O | 0.19 |

[Judgment on Dispersibility of Pigment in Water-soluble Organic Solvent]

The following experiment was made for judging the combination of the pigment and water-soluble organic solvents constituting the aqueous ink according to the present invention, i.e. the combination in which a water-soluble organic solvent does not solvate perfectly or substantially the pigment and also ionic groups at pigment particle surfaces undergo perfectly or substantially no ionic dissociation in the water-soluble organic solvent, that is, the combination in which the pigment is not substantially dispersed in the water-soluble organic solvent By the method described previously, studies were made on combinations of self-dispersion carbon blacks A to D and the various water-soluble organic solvents. Self-dispersion carbon blacks A to D were each dried in an oven heated at 110° C. Thereafter, the resultant self-dispersion carbon blacks A to D were each powdered by means of a mortar or the like to prepare pulverized products. Then, these pigments were each so added to each water-soluble organic solvent to be measured, as to be in a pigment concentration of 0.05 mass %, followed by stirring for about 1 hour. The mixtures obtained were observed to find that, at this point of time, there was the combination of the pigment and water-soluble organic solvent whose clear solid-liquid phase separation was able to be visually ascertained. In such combination, it can be judged that the water-soluble organic solvent does not solvate perfectly or substantially the pigment and also the ionic groups at pigment particle surfaces undergo perfectly or substantially no ionic dissociation in the water-soluble organic solvent, that is, the pigment was not substantially dispersed in the water-soluble organic solvent.

The following measurement was further made to judge the combination in which the pigment was not substantially dispersed in the water-soluble organic solvent. First, a mixture of each pigment and each water-soluble organic solvent which were obtained in the above was allowed to stand at ordinary temperature for about 100 hours. Thereafter, 50 mass % of the upper part of the liquid phase was collected and filtered by the use of a filter of 1.2 µm in pore size. Then, in respect of the resultant filtrate (a coloring material solvent dispersion solution), the concentration of the coloring material contained in the filtrate was measured by the method described below. In addition, the method described below is an example of methods for measurement. In the present invention, examples are by no means limited thereto.

The coloring material concentration in the filtrate was measured by the method described below First, to a coloring material dispersion solution in which the coloring material was dispersed in water in a known concentration (Ck mass %), pure water was added in a stated quantity to dilute it in a stated dilution ratio to prepare a mixture, and the absorbance of the mixture at 550 nm was measured. The measured value of this absorbance is represented by (ABS1). Next, the coloring material solvent dispersion solution (filtrate) whose coloring material concentration was to be determined was diluted with pure water in the same dilution ratio as the above, where the absorbance at 550 nm was likewise measured. The measured value of this absorbance is represented by (ABS2). As a result the coloring material concentration in the coloring material solvent dispersion solution was calculated according to the following expression (2).

Coloring material concentration in coloring material solvent dispersion solution (mass %)=[$Ck$×($ABS2$)])/($ABS2$).  Expression (2)

Using the ratio of the coloring material concentration in the coloring material solvent dispersion solution (filtrate), determined as in the above, to the initial coloring material concentration (concentration set initially: 0.05 mass % in the above example) in the mixture of the coloring material and the water-soluble organic solvent, a dispersion percentage (%) of a specific coloring material in a specific water-soluble organic solvent (hereinafter "coloring material solvent dispersion percentage") was defined as represented by the following expression (3).

Coloring material solvent dispersion percentage (%)=[(coloring material concentration in coloring material solvent dispersion solution)/(initial coloring material concentration)]×100.  Expression (2)

The values of the coloring material solvent dispersion percentage which were obtained by the above measurement and the results of visual observation to as certain the solid-liquid phase separation described above, are shown in Table 2 below. In addition, Pigments A to D in the table refer to self-dispersion carbon blacks A to D (hereinafter "Pigments A to D").

TABLE 2

| Pigment | Water-soluble organic solvent | Solid = liquid separation | Coloring material solvent dispersion percentage (%) |
|---------|------------------------------|---------------------------|------------------------------------------------------|
| A | Polyethylene glycol 600 | Yes | 2.8 |
|   | Glycerol | No | 88.3 |
| B | Polyethylene glycol 600 | Yes | 2.2 |
|   | Glycerol | No | 85.4 |
| C | Polyethylene glycol 600 | No | 18.2 |
|   | Glycerol | No | 99.4 |
| D | Polyethylene glycol 600 | No | 17.1 |
|   | Glycerol | No | 99.7 |

From the results shown in the above Table 2, it can be judged that, since the solid-liquid phase separation has taken place in the combination of Pigment A and polyethylene glycol 600 and the combination of Pigment B and polyethylene glycol 600, this water-soluble organic solvent does not solvate perfectly or substantially the pigment and also the ionic groups of the pigment undergo perfectly or substantially no ionic dissociation in the water-soluble organic solvent, that is the pigment is not substantially dispersed in the water-soluble organic solvent.

In addition to the above judgments the judgment that the above pigment is one that is not solvated perfectly or substantially by the water-soluble organic solvent to be measured and the judgment that the ionic groups at the pigment particle surfaces undergo perfectly or substantially no ionic dissociation in the water-soluble organic solvents to be measured were respectively made by the methods described below.

Specifically, a liquid containing a surfactant having a structure represented by the following structural formula (1) or structural formula (2) and water and having the surfactant in a concentration of 2 mmol/kg (Liquid 1) and a liquid composed of the surfactant, a pigment (any one of pigments A to D) and water and having the surfactant in a concentration of 2 mmol/kg and the pigment in a concentration of 5 mass % (Liquid 2) were prepared first. To prepare Liquid 1 and Liquid 2, the respective components were mixed, followed by stirring at ordinary temperature for about 30 minutes.

Structural formula (1)

(In the structural formula (1), R represents an alkyl group and n represents an integer.)

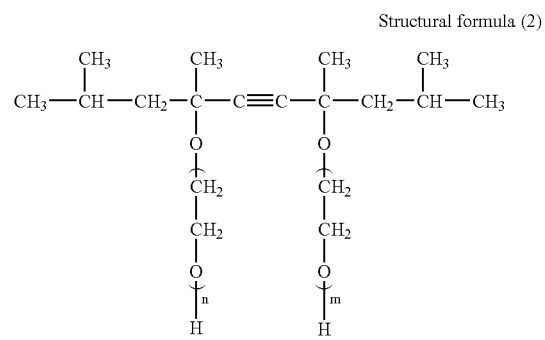

Structural formula (2)

(In the structural formula (2), m and n each represents an integer.)

In addition, the above, pigments A to D were each added to water so that the pigment concentration in the water became 5 mass % to prepare liquids and the surface tension of each of the liquids at ordinary temperature (25° C.) was measured. As a result, it was ascertained that, referring to all pigments A to D, their surface tensions were equal to the surface tension (72 mN/m) of water at ordinary temperature and pigments A to D themselves had no effect of lowering the surface tension of liquid.

The results of measurement of surface tension A and surface tension B at ordinary temperature concerning the above Liquid 1 and Liquid 2, respectively and the difference "B−A" in surface tension between Liquid 2 and Liquid 1 are shown in Table 3.

TABLE 3

| | | | | | Liq. 1 | Liq. 2 | |
| | | | | | Surface tension | | |
| | Surfactant | | | | A | B | B − A |
| Pigment | Formula | R | n | m + n | (mN/m) | (mN/m) | (mN/m) |
| A | (1) | $C_{16}H_{33}$ | 20 | — | 40.0 | 41.3 | 1.3 |
|   | (1) | $C_{16}H_{33}$ | 40 | — | 47.9 | 48.7 | 0.8 |
|   | (2) | — | — | 4 | 34.2 | 38.8 | 4.6 |
|   | (2) | — | — | 10 | 37.0 | 40.1 | 3.1 |
|   | (2) | — | — | 30 | 42.7 | 45.9 | 3.2 |
| B | (1) | $C_{16}H_{33}$ | 20 | — | 40.0 | 40.4 | 0.4 |
|   | (1) | $C_{16}H_{33}$ | 40 | — | 47.9 | 48.1 | 0.2 |
|   | (2) | — | — | 4 | 34.2 | 38.0 | 3.8 |
|   | (2) | — | — | 10 | 37.0 | 39.3 | 2.3 |
|   | (2) | — | — | 30 | 42.7 | 45.0 | 2.3 |
| C | (1) | $C_{16}H_{33}$ | 20 | — | 40.0 | 70.5 | 30.5 |
|   | (1) | $C_{16}H_{33}$ | 40 | — | 47.9 | 65.1 | 17.2 |
|   | (2) | — | — | 4 | 34.2 | 66.5 | 32.3 |
|   | (2) | — | — | 10 | 37.0 | 67.7 | 30.7 |
|   | (2) | — | — | 30 | 42.7 | 58.2 | 15.5 |
| D | (1) | $C_{16}H_{33}$ | 20 | — | 40.0 | 69.6 | 29.6 |

TABLE 3-continued

| Pigment | Surfactant | | | | Liq. 1 Surface tension A (mN/m) | Liq. 2 B (mN/m) | B − A (mN/m) |
|---|---|---|---|---|---|---|---|
| | Formula | R | n | m + n | | | |
| | (1) | C$_{16}$H$_{33}$ | 40 | — | 47.9 | 60.4 | 12.5 |
| | (2) | — | — | 4 | 34.2 | 60.2 | 26.0 |
| | (2) | — | — | 10 | 37.0 | 61.4 | 24.4 |
| | (2) | — | — | 30 | 42.7 | 55.0 | 12.3 |

As is evident from the results shown in Table 3, in pigment A and pigment B, the difference "B−A" between the surface tension A of Liquid 1 and the surface tension B of Liquid 2 shows smaller values than the cases of pigment C and pigment D. This means that, in pigment A and pigment B, the effective concentrations of the surfactants that contribute to the lowering of the surface tension of the liquids are substantially equal without regard to the presence or absence of the pigments. That is, it is judged that the surfactants are not adsorbed perfectly or substantially to pigment A and pigment B. Thus, it can be judged that, for the reasons described previously, pigment A and pigment B are not solvated perfectly or substantially by the medium such as the water-soluble organic solvent.

Subsequently, in respect of the pigments the mediums such as the above water-soluble organic solvents do not solvate perfectly or substantially, the judgment that the ionic groups of the pigments undergo perfectly or substantially no ionic dissociation in the water-soluble organic solvents was made in the following way, which is described taking as an example the case of the above pigment B.

Specifically, first, pigment B is so diluted with each of various water-soluble organic solvents, as to be in a very low concentration to prepare evaluation liquids. As a standard of the dilution, it is set to a level that enables pigment particles to be sufficiently seen when a microscope type zeta potential measuring instrument mentioned below is used. In reference to the evaluation liquids prepared as described above, it is observed whether or not the particles move in a particular direction when a voltage is applied, using a microscope type zeta potential measurement system (trade name: ZEECOM; manufactured by Microtec Nition), which can actually observe the movement of particles. Where the movement of pigment particles are ascertained, their zeta potential is further measured. In addition, in measuring the zeta potential, the viscosity at measurement temperature and the value of the dielectric constant of the water-soluble organic solvents to be used are a necessary, and hence these may preferably be examined or measured in advance.

The results obtained by the above observation and measurement are shown in Table 4.

TABLE 4

| Water-soluble organic solvent | Electrophoresis | Zeta potential (mV) |
|---|---|---|
| Polyethylene glycol 600 | Not do. | — |
| Glycerol | Do. | −29 |

As is evident from Table 4, clear electrophoresis is ascertained in the evaluation liquid making use of glycerol as a water-soluble organic solvent, whereas, in the evaluation liquid making use of a water-soluble organic solvent such as polyethylene glycol 600 or the like, no movement of particles in a particular direction is ascertained in the evaluation liquid, and it can be judged that the particles undergo substantially no electrophoresis. That is, it can be judged that, in such a water-soluble organic solvent in which the particles undergo substantially no electrophoresis, the ionic groups at pigment B particle surfaces undergo perfectly or substantially no ionic dissociation in the water-soluble organic solvent, for the reasons stated previously.

[Judgment of Adsorption of Water-soluble Polymer on Pigment]

The following experiment was made for judging the combination of the pigment and the water-soluble polymer in the case where the water-soluble polymer is added to the aqueous ink according to the present invention, i.e., the combination in which it can be judged that the water-soluble polymer is not adsorbed perfectly or substantially to the pigment particle surfaces. In addition, water-soluble polymers used to judge how much the water-soluble polymers are adsorbed to the pigment are examples. In the present invention, examples are by no means limited to the following water-soluble polymers.

The judgment on whether or not adsorption took place was made by selecting three types of water-soluble polymers: a styrene-acrylic acid copolymer, polyvinyl pyrrolidone, and an ethyl acrylate-acrylic acid copolymer. The anionic polymers, styrene-acrylic acid copolymer and ethyl acrylate-acrylic acid copolymer had an average acid value of about 150, and had a weight-average molecular weight of about 10,000 in both the water-soluble polymers.

Specifically, a liquid composed of each of the above water-soluble polymers and water and having the water-soluble polymer in a concentration of 0.1 mass % (Liquid 3), a liquid composed of each of the above water-soluble polymers, a pigment (any one of pigments B and C) and water and having the water-soluble polymer in a concentration of 0.1 mass % and the pigment in a concentration of 5 mass % (Liquid 4) and a liquid composed of any one of the pigments and water and having the pigment in a concentration of 5.0 mass % (Liquid 5) were prepared first. To prepare Liquid 3, Liquid 4 and Liquid 5, the respective components were mixed, followed by stirring at ordinary temperature for about 30 minutes. In addition, the surface tensions of the above Liquid 5 were measured at ordinary temperature (25° C.) As a result, it was ascertained that all the surface tensions were equal to the surface tension (72 mN/m) of water at ordinary temperature, and pigments B and C themselves had no effect of lowering the surface tension of liquid.

The measurement results of the surface tension C and surface tension D at ordinary temperature respectively in the above Liquid 3 and Liquid 4, the difference "D−C" in surface tension between Liquid 4 and Liquid 3 and the value of (D−C)/(E−C) are shown in Table 5.

TABLE 5

| Pigment | Water-soluble polymer | Liq. 3 Surface tension C (mN/m) | Liq. 4 D (mN/m) | D − C (mN/m) | (D − C)/ (E − C) |
|---|---|---|---|---|---|
| B | Styrene-acrylic acid copolymer | 63.5 | 65.5 | 2.0 | 0.24 |
| | Polyvinyl pyrrolidone | 68.9 | 69.2 | 0.3 | 0.10 |
| | Ethyl acrylate = acrylic acid copolymer | 44.4 | 46.1 | 1.7 | 0.06 |

TABLE 5-continued

| Pigment | Water-soluble polymer | Liq. 3 C (mN/m) | Liq. 4 Surface tension D (mN/m) | D – C (mN/m) | (D – C)/ (E – C) |
|---|---|---|---|---|---|
| C | Styrene-acrylic acid copolymer | 63.5 | 71.0 | 7.5 | 0.90 |
|  | Polyvinyl pyrrolidone | 68.9 | 70.0 | 1.1 | 0.38 |
|  | Ethyl acrylate = acrylic acid copolymer | 44.4 | 55.6 | 11.2 | 0.41 |

As is evident from the results shown in Table 5, values of (D–C)/(E–C) in pigment B are as small as 0.3 or less. This means that the effective concentrations of the water-soluble organic solvents that contribute to the lowering of the surface tension of the liquids are substantially equal without regard to the presence or absence of the pigments. That is, it can be judged that the water-soluble organic solvents are not adsorbed perfectly to substantially on pigment B. In addition, while being not shown in Table 5, it has been ascertained that a styrene-acrylic acid-hydroxyacrylate copolymer having both anionic and nonionic components in one molecule (weight-average molecular weight: 15,000; acid value: 160) also fulfill the above conditions, and is not perfectly or substantially adsorbed to pigment B.

[Preparation of Inks]

Examples 1 to 9

The components shown in Table 6 below were mixed and thoroughly stirred, followed by pressure filtration with a micro-filter of 3.0 μm in pore size (available from Fuji Photo Film Co., Ltd.) to prepare inks of Examples 1 to 9.

Here, the inks were so prepared that the water-soluble organic solvents included a good medium for the pigment in each ink and a poor medium for that pigment, the pigment and the poor medium had such relationships that the poor medium did not solvate perfectly or substantially the pigment and the ionic groups at the pigment particle surfaces underwent perfectly or substantially no ionic dissociation in the poor medium, and also a water-soluble organic solvent showing the maximum Ka value among the respective Ka values of the water-soluble organic solvents as determined by the Bristow method was a poor medium.

Comparative Examples 1 to 5 & Reference Example 1

The components shown in Table 7 below were mixed and thoroughly stirred, followed by pressure filtration with a micro-filter of 3.0 μm in pore size (available from Fuji Photo Film Co., Ltd.) to prepare inks of Comparative Examples 1 to 5 and Reference Example 1.

TABLE 7

|  | Comparative Example | | | | | Ref. Example |
|---|---|---|---|---|---|---|
|  | 1 | 2 | 3 | 4 | 5 | 1 |
| Pigment dispersion A: | — | — | 50.0 | — | — | — |
| Pigment dispersion B: | — | — | — | 50.0 | — | 50.0 |
| Pigment dispersion C: | 50.0 | — | — | — | 50.0 | — |
| Pigment dispersion D: | — | 50.0 | — | — | — | — |
| Glycerol: | 5.0 | 5.0 | 5.0 | 5.0 | — | 10.0 |
| PEG600: | 15.0 | 15.0 | 10.0 | 10.0 | 15.0 | 10.0 |
| Trimethylol-propane: | — | — | 7.0 | 7.0 | — | — |
| ACETYLENOL E-100(*): | 0.1 | 0.1 | 0.1 | 0.1 | 0.1 | 0.1 |
| Styrene-acrylic acid copolymer: | — | — | — | — | — | — |
| Polyvinyl pyrrolidone: | — | — | — | — | — | — |
| Ethyl acrylate-acrylic acid copolymer: | — | — | — | — | — | — |
| Ethyl acrylate-hydroxyacrylate copolymer: | — | — | — | — | — | — |
| Pure water: | 29.9 | 29.9 | 27.9 | 27.9 | 34.9 | 29.9 |

(*)an acetylene glycol ethylene oxide adduct (surfactant available from Kawaken Fine Chemicals Co., Ltd.)

[Inspection of Ink whose Composition is Unknown]

Distinction of whether or not an ink whose composition is unknown (Solvent Inspecting Ink) is what is intended for the present invention can be made by the use of the judgment methods described above. Methods for inspecting inks whose compositions are unknown are described below.

Specifically, the type and content of water-soluble organic solvent contained in Solvent Inspecting Ink is identified first.

TABLE 6

|  | Example | | | | | | | | |
|---|---|---|---|---|---|---|---|---|---|
|  | 1 | 2 | 3 | 4 | 5 | 6 | 7 | 8 | 9 |
| Pigment dispersion A: | 50.0 | — | 50.0 | — | — | — | — | — | — |
| Pigment dispersion B: | — | 50.0 | — | 50.0 | 50.0 | 50.0 | 50.0 | 50.0 | 50.0 |
| Pigment dispersion C: | — | — | — | — | — | — | — | — | — |
| Pigment dispersion D: | — | — | — | — | — | — | — | — | — |
| Glycerol: | 5.0 | 5.0 | 7.0 | 7.0 | 5.0 | 5.0 | 5.0 | 5.0 | 10.0 |
| PEG600: | 15.0 | 15.0 | 3.5 | 3.5 | 15.0 | 15.0 | 15.0 | 15.0 | 10.0 |
| Trimethylolpropane: | — | — | — | — | — | — | — | — | — |
| ACETYLENOL E-100(*): | 0.1 | 0.1 | 0.1 | 0.1 | 0.1 | 0.1 | 0.1 | 0.1 | 0.1 |
| Styrene-acrylic acid copolymer: | — | — | — | — | 1.5 | — | — | — | — |
| Polyvinyl pyrrolidone: | — | — | — | — | — | 1.5 | 1.5 | — | 1.5 |
| Ethyl acrylate-acrylic acid copolymer: | — | — | — | — | — | — | 0.5 | — | 0.5 |
| Ethyl acrylate-hydroxyacrylate copolymer: | — | — | — | — | — | — | — | 1.5 | — |
| Pure water: | 29.9 | 29.9 | 39.4 | 39.4 | 28.4 | 28.4 | 27.9 | 28.4 | 27.9 |

(*)an acetylene glycol ethylene oxide adduct (surfactant available from Kawaken Fine Chemicals Co., Ltd.)

For example, Solvent Inspecting Ink diluted with methanol in a stated concentration is analyzed using GC/MS (trade name: TRACE DSQ; manufactured by ThermoQuest) to identify the type of the water-soluble organic solvent contained in Solvent Inspecting Ink.

It is further judged whether the water-soluble organic solvent thus identified is a good medium or a poor medium. In the good medium/poor medium judgment method described previously, the dispersion is prepared in which the pigment has been dispersed in the water-soluble organic solvent and water. In order to prepare such a dispersion from an ink, the pigment and the dispersing agent must be extracted from the ink. However, in such a case, the pigment and the dispersing agent may change in properties in the course of extraction. Such a possibility can not be denied.

To cope with this, the present inventors have made various studies on good medium/poor medium judgment methods which use an ink itself whose composition is unknown and in which the results obtained thereby are consistent with the result obtained by the good medium/poor medium judgment method described previously. As a result, they have found that the following method is preferable as a method for inspection.

First, an ink dilute solution was prepared in which 100 parts of the water-soluble organic solvent to be inspected was added to 100 parts of an ink whose composition was unknown. More specifically, an ink dilute solution was prepared in which the content of the water-soluble organic solvent to be inspected came to be about 50 mass % (hereinafter "solvent inspecting ink"). Next, the solvent inspecting ink was stored with heating at a temperature of 60° C. for 48 hours, and then the average particle size of the pigment contained therein was measured with a fiber-optics particle analyzer (trade name: FPAR-1000; manufactured by Otsuka Electronics Co., Ltd.). Meanwhile, as a reference, an in dilute solution for good medium/poor medium judgment was prepared in which 100 parts of water was added to 100 parts of the ink whose composition was unknown (hereinafter "inspecting ink dilute solution"), and the average particle size of the pigment contained therein was measured in the state it was not stored with heating. Then, the good medium/poor medium judgment was made in accordance with such a standard that the solvent is judged as a poor medium where the average particle size measured value of the pigment in the solvent inspecting ink is larger than the average particle size measured value of the pigment in the inspecting ink dilute solution, and as a good medium where the pigment average particle size is equal or smaller.

As to the inks prepared in the above Examples, assuming that they were inks whose composition was unknown, it was inspected by the above method that the inks were what were intended for the present invention. Here, description will be made taking as an example the case of the ink of Example 1.

Specifically, a sample prepared by dispensing the ink in Example 1 and diluting it with methanol was used and analyzed using GC/MS (trade name: TRACE DSQ; manufactured by ThermoQuest). As a result, the presence of glycerol and polyethylene glycol 600 was ascertained. Next, to 100 parts of the ink in Example 1, an equal amount 100 parts of each of the above two kinds of water-soluble organic solvents to be inspected was added to prepare two kinds of solvent inspecting inks, where the good medium/poor medium judgment was made using the solvent inspecting inks. More specifically, two kinds of inspecting ink dilute solutions having composition as shown in Table 8 (indicated as solvent inspecting inks 1 and 2 in Table 8) were so prepared that the water-soluble organic solvents to be inspected were each in a content of about 50 mass %. Next, these were stored with heating at a temperature of 60° C. for 48 hours, and then the average particle size of their pigments was measured with a fiber-optics particle analyzer (trade name: FPAR-1,000; manufactured by Otsuka Electronics Co., Ltd.). Meanwhile, as a reference, an ink dilute solution for good medium/poor medium judgment was prepared in which 100 parts of water was added to 100 parts of the ink in Example 1 (hereinafter "inspecting ink dilute fluid"), and the average particle size of the pigment contained therein was measured in the state it was not stored with heating. Then, the good medium/poor medium judgment was made in accordance with such a standard that the solvent is judged as a poor medium where the average particle size measured value of the pigment in the solvent inspecting ink is larger than the average particle size measured value of the pigment in the inspecting ink dilute solution, and as a good medium where the pigment average particle size is equal or smaller.

TABLE 8

|  | Composition (parts) | |
| --- | --- | --- |
|  | Solvent inspecting ink 1 | Solvent inspecting ink 2 |
| Ink of Example 1: | 100 | 100 |
| Glycerol: | 100 | — |
| Polyethylene glycol 600: | — | 100 |

The average particle size of the pigment in each inspecting ink dilute solution, measured as described previously and the average particle size of the pigment in each of the solvent inspecting inks 1 and 2 (having been storage with heating at a temperature of 60° C. for 48 hours) were measured. Then, the solvent was a judged as a poor medium where the average particle size measured value of the pigment in each of the solvent inspecting inks 1 and 2 was larger than the average particle size of the pigment in the inspecting ink dilute solution, and as a good medium where the pigment average particle size was equal or smaller. The results of judgment are shown in Table 9. In addition, letter symbols "O" and "X" in the table stand for a good medium and a poor medium, respectively.

TABLE 9

| Measuring sample | Judgment results |
| --- | --- |
| Solvent inspecting ink 1 | O |
| Solvent inspecting ink 2 | X |
| Inspecting ink dilute solution | — |

As shown in Table 9, also in the results obtained by the good medium/poor medium judgment method making use of the solvent inspecting inks obtained by diluting an actual ink, the glycerol (used in the solvent inspecting ink 1) was judged as a good medium, and the polyethylene glycol 600 (used in the solvent inspecting ink 2) as a poor medium, as in the results of judgment shown in Table 1, where it was ascertainable that the results concerning the two were in agreement with each other. Thus, from the actual ink described above, it has been ascertainable that the method of judging whether the water-soluble organic solvent used in the ink is a good medium or a poor medium for the pigment in the ink is useful. Accordingly, it is deemed that the judgment method making use of the samples obtained by diluting the ink as described above is also effectively utilizable as the good medium/poor medium judgment method.

[Evaluation]

Using the inks of Examples 1 to 9, Comparative Examples 1 to 5 and Reference Example 1 each, evaluation was made on the following items 1 to 5. The results of evaluation are shown in Table 10.

1. Print Density (Usual Ink Quantity)

Using the inks of Examples 1 to 9, Comparative Examples 1 to 5 and Reference Example 1 each, printings in which characters were printed, having solid areas of 2 cm×2 cm, was produced setting an ejection quantity per ink dot within 30 ng±10%. The printings were stored for a day and thereafter the print density of solid areas was measured. To measure the print density, a reflection densitometer (trade name: MACBETH RD-918; manufactured by Macbeth) was used. Evaluation criteria of the print density (usual ink quantity) are as shown below.

In addition, in producing the printings, a modified apparatus of an ink-jet recording apparatus BJS700 (manufactured by CANON INC.) was used, having an on-demand type multi-recording head in which heat energy is applied to an ink in accordance with recording signals to eject the ink. As its printer driver, the default mode was chosen. Setting the conditions of the default mode are as shown below.

Type of paper: Plain paper.
Print quality: Standard.
Color control: Automatic.

As recording mediums, the following,copying sheets (1) to (5) were used.
(1) PPC paper PB Paper (available from CANON INC.).
(2) PPC paper SC250 (available from CANON INC.).
(3) PPC paper 4024 (available from Xerox Corp.).
(4) PPC paper PROWBER BOND (available from Fox River Paper Co.).
(5) PPC paper for CANON (available from Noizidler Ltd.).

Evaluation Criteria:
A: Print density on the five types of paper is 1.4 or more on the average, and print density on paper showing the lowest print density is 1.25 or more.
B: Print density on the five types of paper is 1.4 or more on the average, and print density on paper showing the lowest print density is less than 1.25.
C: Print density on the five types of paper is less than 1.4 on the average.

2. Print Density (Small Ink Quantity)

Printings were produced in the same manner as in the above except that an ejection quantity per ink dot was set within 24 ng ±10% The print density was measured to make evaluation according to the same criteria as the above.

3. Storage Stability

The inks of Examples 1 to 9, Comparative Examples 1 to 5 and Reference Example 1 were each put into a shot bottle, which was then hermetically closed and stored for 2 weeks in a 60° C. oven. Thereafter, the state of the inks was observed. Evaluation criteria of the storage stability are as shown below.

Evaluation Criteria:
A: The pigment is uniformly and stably dispersed in the ink.
C: The pigment is changed like a gel, or the upper part of the ink has come to be transparent, or the ink apparently has thickened.

4. Bleeding

To make evaluation on bleeding, color inks (a cyan ink, a magenta ink and a yellow ink) were prepared. The components shown below were mixed and thoroughly stirred, followed by pressure filtration with a micro-filter of 3.0 μm in pore size (available from Fuji Photo Film Co., Ltd.) to prepare the color inks.

(Cyan Ink)

| C.I. Direct Blue 199 | 3.5 parts |
| Glycerol | 7.5 parts |
| Diethylene glycol | 7.5 parts |
| ACETYLENOL E-100 | 1.0 part |
| Pure water | 80.5 parts |

(Magenta Ink)

| C.I. Acid Red 289 | 2.5 parts |
| Glycerol | 7.5 parts |
| Diethylene glycol | 7.5 parts |
| ACETYLENOL E-100 | 1.0 part |
| Pure water | 81.5 parts |

(Yellow Ink)

| C.I. Direct Yellow 86 | 2.5 parts |
| Glycerol | 7.5 parts |
| Diethylene glycol | 7.5 parts |
| ACETYLENOL E-100 | 1.0 part |
| Pure water | 81.5 parts |

Using the black inks of Examples 1 to 9, Comparative Examples 1 to 5 and Reference Example 1 each and the color inks obtained as described above, printings were produced in which images were so printed that solid areas of black and respective colors (yellow, magenta and cyan) and solid areas of secondary colors (red, green and blue) of the respective colors were adjacent to one another The level of bleeding occurring at the borders between black areas and respective-color areas was visually observed. Evaluation criteria on bleeding are as shown below. In addition, in producing the printings, the ink-jet recording apparatus BJS700 (manufactured by CANON INC.) and PB Paper (available from CANON INC.) were used.

Evaluation Criteria:
AA: No bleeding is seen at all.
A: Almost no bleeding is seen.
B: Bleeding has occurred, but at a level which is substantially no problem.
C: Bleeding has occurred to such an extent that borderlines between colors are unclear.

5. Scratch Resistance

Using the inks of Examples 5 to 9 and Reference Example 1 each, printings were produced in which black solid images of 1 inch×0.5 inch each and characters were printed. Silbon paper and a weight (surface pressure of 40 g/cm$^2$) thereon were placed on solid areas of the printings obtained, and plain paper and Silbon paper were rubbed against each other. Thereafter, Silbon paper and the weight were removed to visually observe how much the solid images stained or any transfer thereof to white background areas. Evaluation criteria on the scratch resistance are as shown below. In addition, in producing the printings, the ink-jet recording apparatus BJS700 (manufactured by CANON INC.) and Super-white Paper (trade name: SW-101; available from CANON INC.) were used.

Evaluation Criteria:

AA: Neither stain at white background areas nor scrape at solid black areas is seen.

A: Stain at white background areas and scrapes at solid black areas are slightly seen.

B: Stain at white background areas and scrapes at solid black areas are somewhat seen.

C: Stains at white background areas and scrapes at solid black areas are seen.

TABLE 10

| | Print density Ink quantity | | Bleed | | Storage sta-bility | Rub = off resis-tance |
| --- | --- | --- | --- | --- | --- | --- |
| | Usual | Small | Pri-mary colors | Second-ary colors | | |
| Example: | | | | | | |
| 1 | A | A | AA | AA | A | — |
| 2 | A | A | AA | AA | A | — |
| 3 | A | A | AA | AA | A | — |
| 4 | A | A | AA | AA | A | — |
| 5 | A | A | AA | AA | A | A |
| 6 | A | A | AA | AA | A | AA |
| 7 | A | A | AA | AA | A | AA |
| 8 | A | A | AA | AA | A | AA |
| 9 | A | A | AA | AA | A | AA |
| Comparative Example: | | | | | | |
| 1 | A | A | AA | A | A | — |
| 2 | A | A | AA | A | A | — |
| 3 | C | C | B | B | A | — |
| 4 | C | C | B | B | A | — |
| 5 | A | B | AA | A | A | — |
| Reference Example: | | | | | | |
| 1 | A | A | AA | AA | A | B |

(Evaluation of Images Obtained in Two-liquid System)

Using the black inks of Examples 1 and 2 and Comparative Examples 1 to 4 obtained as described above, evaluation was made on the following items 1 and 2. The results of evaluation are shown in Table 11.

[Preparation of Reaction Fluid]

The components shown below were mixed and thoroughly stirred, followed by pressure filtration with a microfilter of 3.0 μm in pore size (available from Fuji. Photo Film Co., Ltd.) to prepare reaction liquids.

| | |
| --- | --- |
| Magnesium nitrate (hexahydrate) | 15.0 mass % |
| Trimethylolpropane | 25.0 mass % |
| ACETYLENOL E-100 (acetylene glycol ethylene oxide adduct; available from Kawaken Fine Chemicals Co., Ltd.) | 1.0 mass % |
| Pure water | 59.0 mass % |

[Evaluation]

1. Print Density

Using the inks of Examples 1 and 2 and Comparative Examples 1 to 4 and the reaction liquid obtained as described above, printings in which characters were printed having solid areas of 2 cm×2 cm, were produced. The printings were stored for a day and thereafter the print density of solid areas was measured. To measure the print density, a reflection densitometer (trade name: MACBETH RD-918; manufactured by Macbeth) was used. Evaluation criteria of the print density are as shown below.

Figure 15:
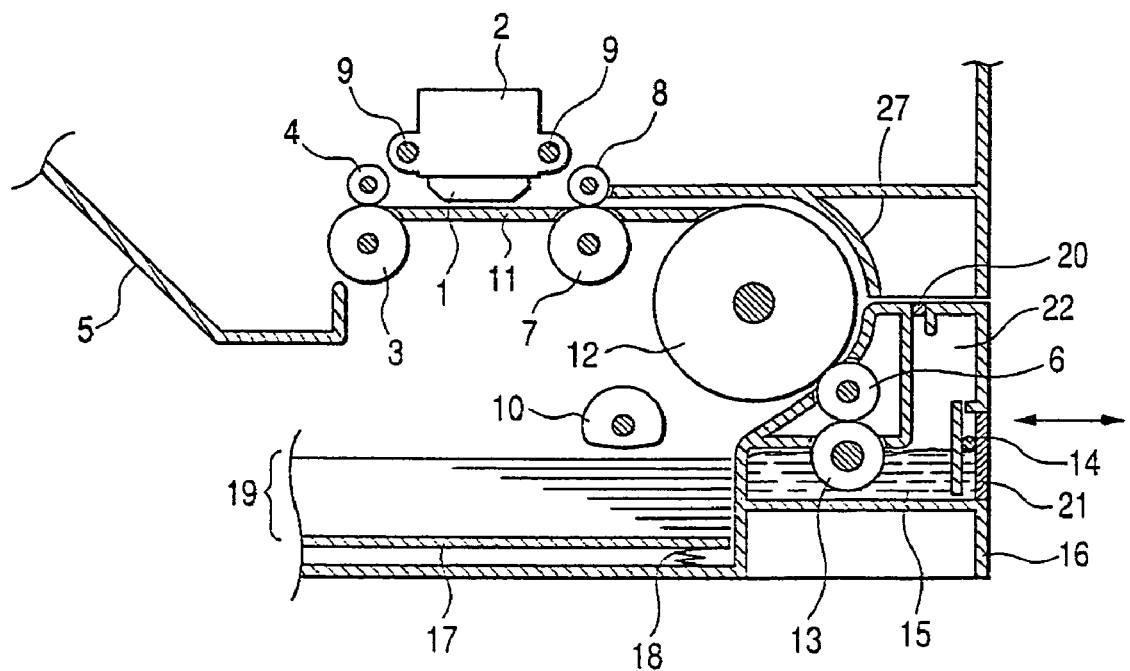
FIG. 15 is a schematic of the side elevation showing an example of an ink-jet recording apparatus.

In addition, in producing the printings, a modified apparatus of an ink-jet recording apparatus BJS700 (manufactured by CANON INC.) was used, having an on-demand type multi-recording head in which heat energy is applied to an ink in accordance with recording signals to eject the ink, which was so modified as to have a mechanism for applying the reaction liquid to the recording medium by means of a coating roller as shown in FIG. 15. To apply the reaction liquid and each ink, the ink was so applied that the ejection quantity per ink dot was within 30 ng ±10%, immediately after the reaction liquid was fixed to the recording medium. Also, to apply the reaction liquid, the speed of the roller and the contact pressure of the roller with the recording medium were so adjusted that its application amount was 2.4 g/m$^2$.

As the printer driver, the default mode was chosen. Setting the conditions of the default mode are as shown below.

Type of paper: Plain paper.
Print quality: Standard.
Color control: Automatic.

As recording mediums, the following copying sheets (1) to (7) were used.

(1) PB Paper (available from CANON INC.).
(2) SC250 (available from CANON INC.).
(3) PPC paper 4200 (available from Xerox Corp.).
(4) PPC paper 4024 (available from Xerox Corp.).
(5) Super-white Paper SW-101 (available from CANON INC.).
(6) Fox River PPC paper PROWBER-BOND (available from Fox River Paper Co.).
(7) PPC paper Hammer Mill Jet (available from International Paper Co.).

Evaluation Criteria:

AA: Print density on the five types of paper is 1.45 or more on the average, or print density on paper showing the lowest print density is 1.3 or more.

A: Print density on the five types of paper is from 1.4 or more to less than 1.45 on the average, and print density on paper showing the lowest print density is from 1.25 or more to less than 1.3.

B: Print density on the five types of paper is from 1.4 or more to less than 1.45 on the average, and print density on paper showing the lowest print density is less than 1.25.

C: Print density on the five types of paper is less than 1.4 on the average.

2. Bleeding

Printings were produced using the black inks in Examples 1 and 2, Comparative Examples 1 to 4, the same color inks (a cyan ink, a magenta ink and a yellow ink) as those obtained as described above and the reaction liquid obtained as described above. On recording mediums coated with the reaction liquid at a application amount of 2.4 g/m$^2$, images were so printed that solid areas of black and respective colors. (yellow, magenta and cyan) and solid areas of secondary colors (red, green and blue) of the respective colors were adjacent to one another. The level of bleeding occurring at the borders between black areas and respective-color areas was visually observed. Evaluation criteria on the bleeding areas shown below.

In addition, the printings were produced using an ink-jet recording apparatus BJS700 (manufactured by CANON INC.) which was so modified as to have a mechanism for applying the reaction liquid to the recording medium by means of the coating roller as shown in FIG. 15, and PB Paper (available from CANON INC.).

Evaluation Criteria:

AA: No bleeding is seen at all.

A: Almost no bleeding is seen.

B: Bleeding has occurred, but at a level of substantially no problem.

C: Bleeding has occurred to such an extent that borderlines between colors are unclear.

TABLE 11

|  | | Bleed | |
| --- | --- | --- | --- |
| | Print density | Primary colors | Secondary colors |
| Example: | | | |
| 1 | AA | AA | AA |
| 2 | AA | AA | AA |
| Comparative Example: | | | |
| 1 | AA | AA | A |
| 2 | AA | AA | A |
| 3 | A | AA | A |
| 4 | A | AA | A |

This application claims priorities from Japanese Patent Application Nos. 2004-189906.filed on Jun. 28, 2004, 2004-189910 filed on Jun. 28, 2004 and 2004-190554 filed on Jun. 28, 2004, which are incorporated hereinto by reference.

What is claimed is:

1. An aqueous ink comprising at least water, a plurality of water-soluble organic solvents and a coloring material,
wherein the coloring material is a pigment containing a pigment particle having at least one ionic group bonded to a surface of the pigment particle directly or via another atomic group,
wherein the plurality of water-soluble organic solvents include a good medium or good mediums for the pigment and a poor medium or poor mediums for the pigment,
wherein the poor medium does not solvate perfectly or substantially the pigment,
wherein the ionic group undergoes perfectly or substantially no ionic dissociation in the poor medium,
wherein a water-soluble organic solvent which shows the maximum Ka value among the respective Ka values of the plurality of water-soluble organic solvents as determined by the Bristow method is the poor medium,
wherein, where the total content (mass %) of the good medium in the aqueous ink is represented by X, and the total content (mass %) of the poor medium in the aqueous ink is represented by Y, the ratio of X:Y is 10:5 or more to 10:30 or less, and
wherein, where the surface tension of a liquid containing a surfactant and water, and the concentration of the surfactant is 2 mmol/kg, is represented by A (mN/m) and the surface tension of a liquid containing the surfactant, a pigment, and water, and the concentration of the surfactant is 2 mmol/kg and the concentration of the pigment is 5 mass %, is represented by B, the pigment satisfies the relationship of B−A≦10.

2. The aqueous ink according to claim 1, wherein the surfactant has a structure represented by the following structural formula (1):

Structural formula (1)

wherein R represents an alkyl group and n represents an integer.

3. The aqueous ink according to claim 1, wherein the surfactant has a structure represented by the following structural formula (2):

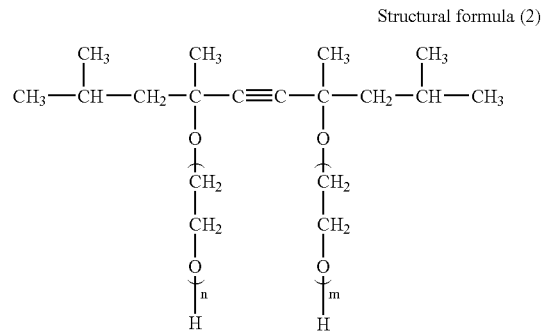
Structural formula (2)

wherein m and n each represents an integer.

4. The aqueous ink according to claim 1, wherein the pigment causes perfectly or substantially no electrophoresis in the poor medium.

5. The aqueous ink according to claim 1, wherein the ionic group is one selected from the group consisting of —COOM1, —SO$_3$M1 and —PO$_3$H(M$_1$)$_2$, wherein M1 represents a hydrogen atom, an alkali metal, an ammonium or an organic ammonium.

6. The aqueous ink according to claim 1, wherein the other atomic group is one selected from the group consisting of an alkylene group having 1 to 12 carbon atoms, a substituted or unsubstituted phenylene group and a substituted or unsubstituted naphthylene group.

7. The aqueous ink according to claim 1, wherein the Ka value determined by the Bristow method is less than 1.5 ml/m$^2$/msec$^{1/2}$.

8. The aqueous ink according to claim 1, wherein the Ka value determined by the Bristow method is 0.2 ml/m$^2$/msec$^{1/2}$ or more.

9. The aqueous ink according to claim 1, wherein the content (mass %) of the pigment is from 0.1 mass % to 15 mass % based on the total mass of the ink.

10. The aqueous ink according to claim 1, wherein the content (mass %) of the pigment is from 1 mass % to 10 mass % based on the total mass of the ink.

11. The aqueous ink according to claim 1, wherein the ink further contains a water-soluble polymer which is not adsorbed perfectly or substantially to the pigment.

12. The aqueous ink according to claim 11, wherein the water-soluble polymer has a ionic hydrophilic group.

13. The aqueous ink according to claim 11, wherein the water-soluble polymer has a nonionic hydrophilic group.

14. The aqueous ink according to claim 11, wherein the ink contains a plurality of water-soluble polymers.

15. The aqueous ink according to claim 11, wherein the water-soluble polymer is a water-soluble polymer formed by copolymerizing a monomer having an ionic hydrophilic group in the molecule and a monomer having a nonionic hydrophilic group in the molecule.

16. A aqueous ink which is used in an image forming method having the step of applying an aqueous ink comprising a pigment to a recording medium and the step of applying a reaction liquid capable of making the state of dispersion of the pigment in the aqueous ink unstable upon contact with the aqueous ink to the recording medium,
wherein the aqueous ink is the aqueous ink according to claim 1.

17. A set of an aqueous ink and a reaction liquid, which is used in an image forming method having the step of applying an aqueous ink comprising a pigment to a recording medium and the step of applying a reaction liquid capable of making the state of dispersion of the pigment in the aqueous ink unstable upon contact with the aqueous ink to the recording medium,
wherein the aqueous ink is the aqueous ink according to claim 1.

18. An image forming method comprising the steps of:
(i) applying an aqueous ink comprising a pigment to a recording medium, and
(ii) applying a reaction liquid capable of making the state of dispersion of the pigment in the aqueous ink unstable upon contact with the aqueous ink to the recording medium,
wherein the aqueous ink is the aqueous ink according to claim 1, and
wherein the step (i) is carried out after the reaction liquid has come completely fixed to the recording medium in the step (ii).

19. The aqueous ink according to claim 1, which is used for ink-jet recording.

20. An ink-jet recording method comprising the step of ejecting an ink by ink-jet method, wherein the ink is the aqueous ink according to claim 1.

21. An ink cartridge comprising an ink holding member containing an ink therein, wherein the ink is the aqueous ink according to claim 1.

22. A recording unit comprising an ink holding member containing an ink therein and a recording head for ejecting an ink therefrom, wherein the ink is the aqueous ink according to claim 1.

23. An ink-jet recording apparatus comprising an ink holding member containing an ink therein and a recording head for ejecting an ink therefrom, wherein the ink is the aqueous ink according to claim 1.

24. An image forming method which performs recording by an ink-jet recording method on a recording medium by the use of a black ink and at least one color ink,
wherein the aqueous ink according to claim 19 is used as the black ink, and
wherein in forming an image composed of an image formed by the black ink and an image formed by the color ink which are adjacent to each other, performing scanning for applying the black ink to form the image and thereafter performing scanning for applying the color ink to the area where the image has been formed by the precedent scanning.

25. The image forming method according to claim 24, wherein the color ink is applied by scanning with delay of at least one scanning after application of the black ink by scanning.

26. The image forming method according to claim 24, wherein the inks are applied by use of a recording head in which an ejection orifice line for ejecting a black ink therefrom and an ejection orifice lines for ejecting color ink therefrom are placed to be shifted from each other in a secondary scanning direction.

* * * * *

UNITED STATES PATENT AND TRADEMARK OFFICE
CERTIFICATE OF CORRECTION

PATENT NO. : 7,276,112 B2  Page 1 of 1
APPLICATION NO. : 11/313785
DATED : October 2, 2007
INVENTOR(S) : Tokuda et al.

It is certified that error appears in the above-identified patent and that said Letters Patent is hereby corrected as shown below:

<u>On The Title Page</u>
In Item (*), Notice:

After "Subject to any disclaimer, the term of this patent is extended or adjusted under 35 U.S.C. 154(b) by 0 days."

insert the following sentence:

--This patent is subject to a terminal disclaimer.--.

Signed and Sealed this

Fifteenth Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,276,112 B2
APPLICATION NO. : 11/313785
DATED : October 2, 2007
INVENTOR(S) : Yui Tokuda et al.

It is certified that error appears in the above-identified patent and that said Letters Patent is hereby corrected as shown below:

COLUMN 1:
        Line 18, "u se" should read --use--.
        Line 21, "methods," should read --method,-- and "recoding" should read
              --recording--.
        Line 40, "particles" should read --particles,--.
        Line 45, "2000-63719)" should read --2000-63719).--.

COLUMN 3:
        Line 9, "recoding" should read --recording--.

COLUMN 4:
        Line 22, "recording. medium" should read --recording medium--.
        Line 29, "recoding" should read --recording--.
        Line 54, "View" should read --view--.

COLUMN 5:
        Line 13, "it" should read --in--.

COLUMN 6:
        Line 7, "become" should read --becomes--.
        Line 16, "impact" should read --impacts--.

COLUMN 7:
        Line 16, "Whether" should read --whether--.
        Line 55, "according," should read --according--.

COLUMN 8:
        Line 45, "salvation" should read --solvation--.

COLUMN 9:
        Line 13, "an other" should read --another--.
        Line 34, "available" should read --available.--.
        Line 50, "collected" should read --collected,--.

COLUMN 10:
        Line 48, "be," should read --be--.
        Line 52, "size" should read --size,--.

UNITED STATES PATENT AND TRADEMARK OFFICE
CERTIFICATE OF CORRECTION

PATENT NO. : 7,276,112 B2
APPLICATION NO. : 11/313785
DATED : October 2, 2007
INVENTOR(S) : Yui Tokuda et al.

It is certified that error appears in the above-identified patent and that said Letters Patent is hereby corrected as shown below:

COLUMN 12:
       Line 58, "above" should read --above.--.

COLUMN 13:
       Line 21, "shows," should read --shows--.

COLUMN 14:
       Line 39, "polymer" should read --polymer.--.

COLUMN 15:
       Line 40, "DC" should read --D-C--.

COLUMN 16:
       Line 43, "material" should read --material.--.

COLUMN 17:
       Line 12, "atoms" should read --atoms,--.
       Line 13, "propylene glycol" should read --propylene glycol,--.
       Line 39, "1.0:10" should read --10:10--.
       Line 61, "large," should read --large--.

COLUMN 18:
       Line 2, "used" should read --used.--.
       Line 60, "1190ULTRA-II" should read --1190 ULTRA-II--.

COLUMN 19:
       Line 18, "or" should be deleted.
       Line 20, "maroon" should read --Maroon--.

COLUMN 20:
       Line 8, "group" should read --group.--.
       Line 10, "anionic" should read --an ionic--.

COLUMN 21:
       Line 52, "solution" should read --solution,--.
       Line 67, "maybe" should read --may be--.

UNITED STATES PATENT AND TRADEMARK OFFICE
CERTIFICATE OF CORRECTION

PATENT NO. : 7,276,112 B2
APPLICATION NO. : 11/313785
DATED : October 2, 2007
INVENTOR(S) : Yui Tokuda et al.

It is certified that error appears in the above-identified patent and that said Letters Patent is hereby corrected as shown below:

COLUMN 23:
    Line 41, "water base" should read --water-based--.
    Line 57, "ink" should read --ink.--.

COLUMN 24:
    Line 10, "dyes" should read --dyes,--.
    Line 61, "acids acrylic" should read --acids, acrylic--.

COLUMN 25:
    Line 1, "a" should be deleted.

COLUMN 26:
    Line 14, "$Ba^{2+}$" should read --$Ba^{2+}$,--.
    Line 16, "liquid" should read --liquid,--.
    Line 36, "exhibiting" should read --exhibit--.
    Line 38, "level" should read --level,--.
    Line 46, "he" should read --the--.

COLUMN 27:
    Line 5, "system" should read --system,--.
    Line 28, "$1.3\ mL/m^{-2}/msec^{-1/2}$" should read --$1.3\ mL/m^{2}/msec^{1/2}$--.
    Line 29, "$6.0\ mL/m^{-2}/msec^{1/2}$" should read --$6.0\ mL/m^{2}/msec^{1/2}$--.
    Line 30, "$mL/m^{-2}/msec^{-1/2}$" (both occurrences) should read --$mL/m^{2}/msec^{1/2}$--.

COLUMN 28:
    Line 31, "line" should read --line.--.

COLUMN 30:
    Line 62, "moved" should read --moved,--.
    Line 67, "thee" should read --the--.

COLUMN 31:
    Line 2, "assembly 64" should read --assembly 64,--.
    Line 60, "apparatuses described" should read --apparatus as described--.
    Line 61, "provided" should read --provided,--.

UNITED STATES PATENT AND TRADEMARK OFFICE
CERTIFICATE OF CORRECTION

PATENT NO. : 7,276,112 B2
APPLICATION NO. : 11/313785
DATED : October 2, 2007
INVENTOR(S) : Yui Tokuda et al.

It is certified that error appears in the above-identified patent and that said Letters Patent is hereby corrected as shown below:

COLUMN 33:
        Line 51, "added" should read --added to--.
        Line 53, "ice-bath" should read --ice bath--.

COLUMN 35:
        Line 6, "indispersion" should read --in dispersion--.

COLUMN 36:
        Line 22, "solvent" should read --solvent.--.
        Line 61, "below" should read --below.--.

COLUMN 37:
        Line 6, "result" should read --result,--.
        Line 11, "])" should read --]--.
        Line 25, "Expression (2)" should read --Expression (3)--.
        Line 28, "as certain" should read --ascertain--.
        Line 29, "above," should read --above--.
        Line 58, "judgments" should read --judgment--.

COLUMN 38:
        Line 31, "above," should read --above--.
        Line 33, "liquids" should read --liquids,--.
        Line 42, "respectively" should read --respectively,--.

COLUMN 39:
        Line 51, "a" should be deleted.

COLUMN 40:
        Line 27, "copolymer had" should read --copolymer had,--.

COLUMN 43:
        Line 36, "in" should read --ink--.

COLUMN 44:
        Line 34, "storage" should read --in storage--.

UNITED STATES PATENT AND TRADEMARK OFFICE
CERTIFICATE OF CORRECTION

PATENT NO. : 7,276,112 B2
APPLICATION NO. : 11/313785
DATED : October 2, 2007
INVENTOR(S) : Yui Tokuda et al.

It is certified that error appears in the above-identified patent and that said Letters Patent is hereby corrected as shown below:

COLUMN 45:
    Line 12, "was" should read --were--.
    Line 49, "10%" should read --10%.--.

COLUMN 46:
    Line 38, "another" should read --another.--.

COLUMN 49:
    Line 27, "2004-189906.filed" should read --2004-189906 filed--.

COLUMN 50:
    Line 36 Claim 5, "$M_1$" should read --M1--.
    Line 60 Claim 12, "a" should read --an--.

COLUMN 51:
    Line 4 Claim 16, "A" should read --An--.

Signed and Sealed this

Seventeenth Day of February, 2009

JOHN DOLL
*Acting Director of the United States Patent and Trademark Office*